US008756381B2

(12) United States Patent
Muramatsu et al.

(10) Patent No.: US 8,756,381 B2
(45) Date of Patent: Jun. 17, 2014

(54) STORAGE SUBSYSTEM AND LOAD DISTRIBUTION METHOD FOR EXECUTING DATA PROCESSING USING NORMAL RESOURCES EVEN IF AN ABNORMALITY OCCURS IN PART OF THE DATA PROCESSING RESOURCES THAT INTERMEDIATE DATA PROCESSING BETWEEN A HOST COMPUTER AND A STORAGE DEVICE

(75) Inventors: Kotaro Muramatsu, Odawara (JP);
Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 13/139,640

(22) PCT Filed: Jun. 1, 2011

(86) PCT No.: PCT/JP2011/003096
§ 371 (c)(1),
(2), (4) Date: Jun. 14, 2011

(87) PCT Pub. No.: WO2012/164625
PCT Pub. Date: Dec. 6, 2012

(65) Prior Publication Data
US 2012/0311275 A1    Dec. 6, 2012

(51) Int. Cl.
*G06F 12/00* (2006.01)

(52) U.S. Cl.
USPC .......... 711/154; 711/E12.001; 711/5; 714/702

(58) Field of Classification Search
CPC ....... G06F 13/385; G06F 13/38; G06F 13/00; G06F 3/038; G06F 3/01; G06F 3/067; G06F 3/061; G06F 3/0635; G06F 3/064; G06F 3/0659; G06F 3/0665; G06F 3/0689; G06F 3/0604; G06F 3/0631; G06F 3/0632; G06F 3/0637; G06F 3/0647; G06F 3/065; G06F 3/0683; G06F 3/0661; G06F 3/0676; G06F 11/00; G06F 11/16; G06F 11/2005; G06F 11/2082; G06F 11/2097; G06F 11/2074; G06F 11/2015; G06F 11/2064; G06F 11/2069; G06F 11/2071; G06F 11/2089; G06F 11/3034; G06F 11/3058; G06F 12/0866; G06F 1/30; G06F 2212/312; G06F 2206/1012; G06F 2201/82

USPC ................................ 711/5, 154, 165, E12.002
See application file for complete search history.

(56) References Cited

U.S. PATENT DOCUMENTS 6,044,444 A * 3/2000 Ofek ............................. 711/162
6,295,575 B1 * 9/2001 Blumenau et al. ................ 711/5
(Continued)

FOREIGN PATENT DOCUMENTS

EP    0 747 822 A2    6/1996
EP    1 936 487 A2    6/2008
(Continued)

Primary Examiner — Arpan P. Savla
Assistant Examiner — Edward Waddy, Jr.
(74) Attorney, Agent, or Firm — Volpe and Koenig, P.C.

(57) ABSTRACT

A storage subsystem coupled to a host computer is described. The storage subsystem includes storage devices and first and second storage apparatuses that control data transfer between the host computer and the storage devices. The first storage apparatus includes a first controller coupled to the host computer via a first host communication control unit and to the storage devices via a first storage device communication control unit. The second storage apparatus includes a second controller coupled to the host computer via a second host communication control unit and to the storage devices via a second storage device communication control unit. At least one of the controllers monitors a status of the first host communication control unit and the storage device communication control units, and, if the status of the first storage device communication unit indicates failure, switch communication paths for transferring data from the host computer to the storage devices.

14 Claims, 30 Drawing Sheets

(56) References Cited

U.S. PATENT DOCUMENTS

| | | | |
|---|---|---|---|
| 6,356,978 B1* | 3/2002 | Kobayashi et al. | 711/113 |
| 7,085,883 B1* | 8/2006 | Dalgic et al. | 711/114 |
| 7,203,862 B2* | 4/2007 | Fujimoto | 714/6.31 |
| 7,971,011 B2* | 6/2011 | Furukawa et al. | 711/161 |
| 2005/0172073 A1* | 8/2005 | Voigt et al. | 711/114 |
| 2005/0228943 A1* | 10/2005 | DeCenzo et al. | 711/114 |
| 2007/0028041 A1* | 2/2007 | Hallyal et al. | 711/114 |
| 2007/0168705 A1* | 7/2007 | Dohi | 714/6 |
| 2008/0301385 A1* | 12/2008 | Nagata et al. | 711/162 |
| 2009/0193208 A1* | 7/2009 | Ozaki et al. | 711/162 |
| 2010/0077106 A1* | 3/2010 | Komikado et al. | 710/5 |
| 2012/0060002 A1* | 3/2012 | Danilak | 711/154 |

FOREIGN PATENT DOCUMENTS

| | | |
|---|---|---|
| JP | 2008-134775 A | 6/2008 |
| WO | 2010/041481 A1 | 4/2010 |

* cited by examiner

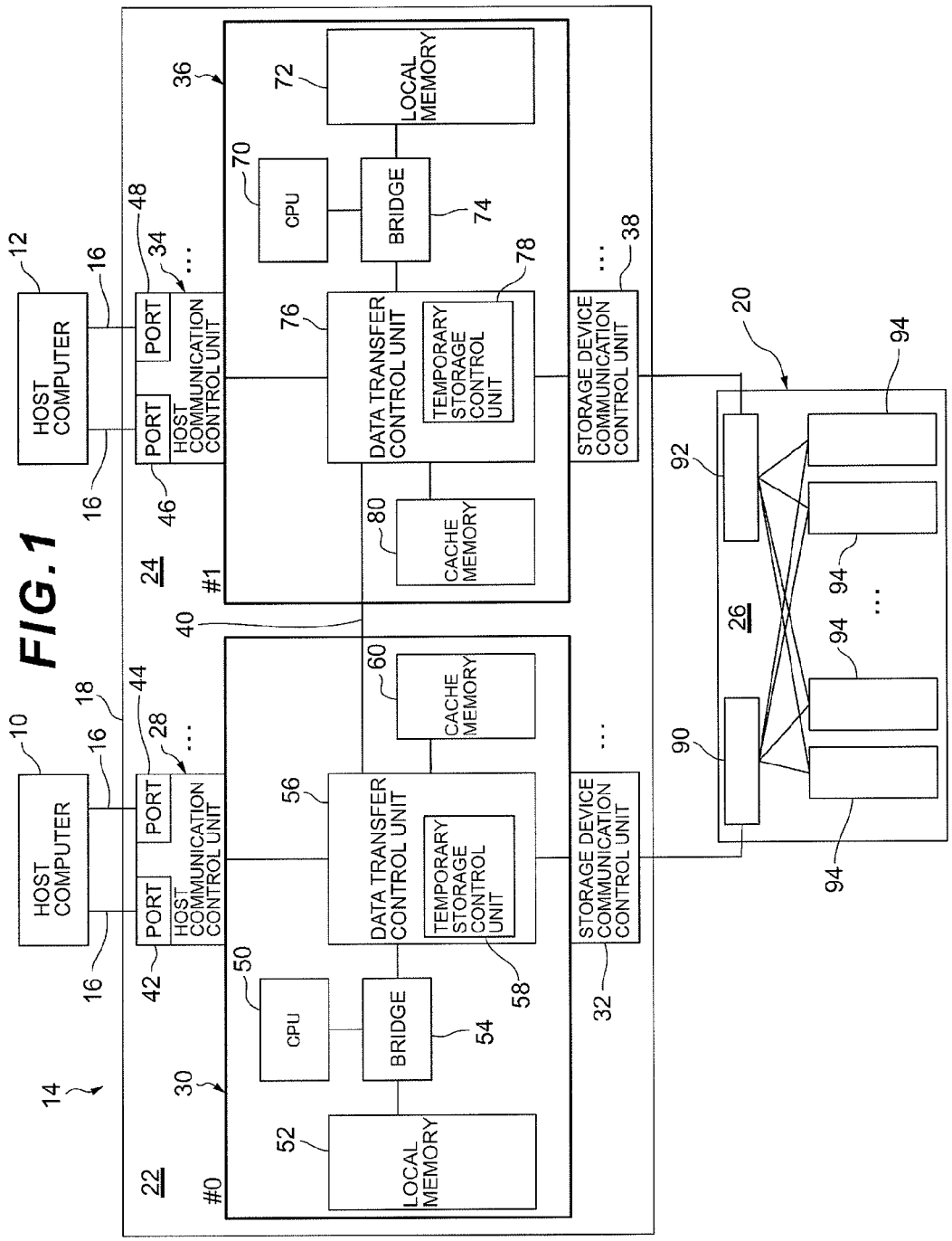

FIG.2

MEMORY MAP (100)

| ADDRESS (102) | MEMORY MAP (104) |
|---|---|
| AAAAA–BBBBB | LOCAL-SYSTEM LOCAL MEMORY |
| EEEEE–FFFFF | LOCAL-SYSTEM I/F #0 HOST COMMUNICATION PROTOCOL REGISTER |
| GGGGG–HHHHH | LOCAL-SYSTEM I/F #1 HOST COMMUNICATION PROTOCOL REGISTER |
| IIIII–JJJJJ | LOCAL-SYSTEM DRV #0 STORAGE DEVICE COMMUNICATION PROTOCOL REGISTER |
| KKKKK–LLLLL | LOCAL-SYSTEM DRV #1 STORAGE DEVICE COMMUNICATION PROTOCOL REGISTER |
| PPPPP– | LOCAL-SYSTEM DATA TRANSFER CONTROL UNIT REGISTER |
|   Paaaa–Pbbbb | TEMPORARY STORAGE CONTROL UNIT REGISTER FOR LOCAL SYSTEM |
|   Pcccc–Pdddd | TEMPORARY STORAGE CONTROL UNIT REGISTER FOR THE OTHER SYSTEM |
| QQQQQ–RRRRR | LOCAL-SYSTEM AND OTHER-SYSTEM CACHE MEMORY |
| SSSSS–TTTTT | OTHER-SYSTEM LOCAL MEMORY |
| WWWWW–XXXXX | OTHER-SYSTEM I/F #0 HOST COMMUNICATION PROTOCOL REGISTER |
| YYYYY–ZZZZZ | OTHER-SYSTEM I/F #1 HOST COMMUNICATION PROTOCOL REGISTER |
| aaaaa–bbbbb | OTHER-SYSTEM DRV #0 STORAGE DEVICE COMMUNICATION PROTOCOL REGISTER |
| ccccc–ddddd | OTHER-SYSTEM DRV #1 STORAGE DEVICE COMMUNICATION PROTOCOL REGISTER |
| zzzzz– | OTHER-SYSTEM DATA TRANSFER CONTROL UNIT REGISTER |
|   zaaaa–zbbbb | TEMPORARY STORAGE CONTROL UNIT REGISTER FOR THE OTHER SYSTEM |
|   zcccc–zeeee | TEMPORARY STORAGE CONTROL UNIT REGISTER FOR LOCAL SYSTEM |

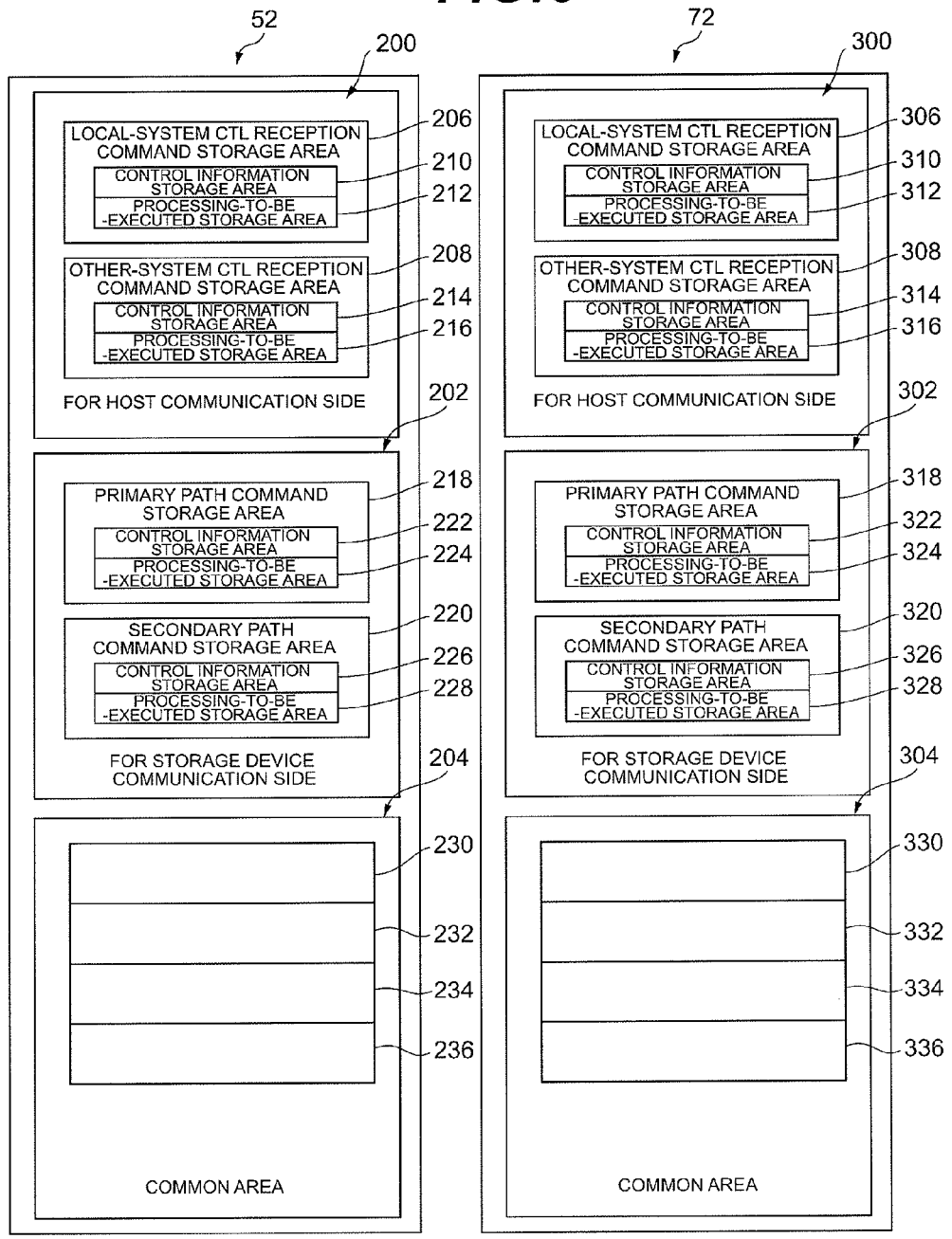

FIG.5

| LU# | CONTROLLER NUMBER IN CHARGE | PROCESSING FLAG |
|---|---|---|
| 0 | CTL0 | IN PROCESS |
| 1 | CTL1 | IN PROCESS |
| 2 | CTL1 | IN PROCESS |
| 3 | CTL0 | NO I/O |
| 4 | CTL1 | NO I/O |
| ... | ... | |

FIG.6

| LU# | POOL FLAG | RG# | POOL NUMBER | UNIT NUMBER | DRIVE NUMBER | CONTROLLER NUMBER IN CHARGE OF PRIMARY PATH |
|---|---|---|---|---|---|---|
| 0 | USED | — | 256 | 0 | 0,1,2,3,4 | CTL0 |
| 1 | USED | — | 256 | 0 | 0,1,2,3,4 | CTL0 |
| 2 | USED | — | 256 | 0 | 0,1,2,3,4 | CTL0 |
| 3 | UNUSED | 0 | — | 1 | 2,3,4 | CTL1 |
| 4 | UNUSED | 0 | — | 1 | 2,3,4 | CTL1 |
| 5 | USED | — | 254 | 1 | 10,11,12,13,14,15 | CTL1 |
| ... | ... | ... | ... | ... | ... | ... |

| MOUNTED CTL NUMBER | TYPE | I/F NUMBER | STATUS |
|---|---|---|---|
| 0 | HOST COMMUNICATION CONTROL UNIT | 0 | NORMAL |
| 0 | HOST COMMUNICATION CONTROL UNIT | 1 | NORMAL |
| 0 | STORAGE DEVICE COMMUNICATION CONTROL UNIT | 0 | NORMAL |
| 0 | STORAGE DEVICE COMMUNICATION CONTROL UNIT | 1 | ABNORMAL |
| ... | ... | ... | |
| 1 | HOST COMMUNICATION CONTROL UNIT | 0 | ABNORMAL |
| 1 | HOST COMMUNICATION CONTROL UNIT | 1 | NORMAL |
| 1 | STORAGE DEVICE COMMUNICATION CONTROL UNIT | 0 | NORMAL |
| 1 | STORAGE DEVICE COMMUNICATION CONTROL UNIT | 1 | NORMAL |
| ... | ... | ... | |

FIG.8

| EXECUTION CONTROLLER NUMBER | AREA LOCATION | READING RESULT | READ LOCATION ADDRESS | READ DATA |
|---|---|---|---|---|
| CTL0 | FOR LOCAL SYSTEM | -(BEING EXECUTED) | LOCAL-SYSTEM HOST COMMUNICATION CONTROL UNIT | - |
| CTL0 | FOR THE OTHER SYSTEM | SUCCESS | OTHER-SYSTEM STORAGE DEVICE COMMUNICATION CONTROL UNIT | DDDD |
| CTL1 | FOR LOCAL SYSTEM | FAILURE | LOCAL-SYSTEM STORAGE DEVICE COMMUNICATION CONTROL UNIT | INVALID DATA |
| CTL1 | FOR THE OTHER SYSTEM | -(BEING EXECUTED) | OTHER-SYSTEM HOST COMMUNICATION CONTROL UNIT | - |

FIG.9

| VECTOR NUMBER | CONTENT | PRIORITY |
|---|---|---|
| AAA | xxxxx | 1 |
| ... | ... | ... |
| aaa | FAULT OF I/F #0 FOR HOST COMMUNICATION CONTROL UNIT | 16 |
| bbb | FAULT OF I/F #1 FOR HOST COMMUNICATION CONTROL UNIT | 16 |
| ccc | FAULT OF I/F #0 FOR STORAGE DEVICE COMMUNICATION CONTROL UNIT | 17 |
| ddd | FAULT OF I/F #1 FOR STORAGE DEVICE COMMUNICATION CONTROL UNIT | 17 |
| ... | ... | ... |

STORAGE SUBSYSTEM AND LOAD DISTRIBUTION METHOD FOR EXECUTING DATA PROCESSING USING NORMAL RESOURCES EVEN IF AN ABNORMALITY OCCURS IN PART OF THE DATA PROCESSING RESOURCES THAT INTERMEDIATE DATA PROCESSING BETWEEN A HOST COMPUTER AND A STORAGE DEVICE

TECHNICAL FIELD

The present invention relates to: a storage subsystem having storage devices and a plurality of storage apparatuses for controlling data input to, and output from, the storage devices; and a load distribution method for the storage subsystem.

BACKGROUND ART

There is a conventionally suggested storage subsystem that has storage devices and a plurality of controllers for controlling data input to, and output from, the storage devices wherein each controller is connected via a controller-to-controller connection path; and when one controller receives a write command or read command, which should be executed by a controller of the other system, from a host computer, it transfers the received write command or read command to the controller of the other system via the controller-to-controller connection path (see Patent Literature 1).

When one controller of the above-described storage subsystem receives a write command or read command, which should be executed by the controller of the other system, from the host computer, it transfers the received write command or read command to the controller of the other system, thereby writing the write command or read command to a local memory for the other system. So, every time one controller receives a write command or read command, it can process the write command or read command without communicating with other controllers.

CITATION LIST

Patent Literature

PTL 1: Japanese Patent Application Laid-Open (Kokai) Publication No. 2008-134775

SUMMARY OF INVENTION

Technical Problem

The storage subsystem described in Patent Literature 1 does not pay attention to the occurrence of a fault at each controller. So, if a fault occurs in part of one of the controllers, for example, at a host communication control unit for sending or receiving information to or from a host computer, the respective elements of one controller are integrated and, therefore, the controller is blocked and then replaced even other elements are normal. In this case, while one controller is replaced with a normal controller, the other controller will be accessed intensively by the host computer.

Incidentally, if a fault occurs in the storage device communication control unit, which sends/receives data to/from the storage device, in one controller, the host computer can access the storage device via the other controller without replacing one controller with a normal controller by switching a host path to one controller to a host path to the other controller. However, after switching to the host path to the other controller, internal processing for accessing the storage device requires time, so response performance of the entire storage subsystem may deteriorate.

The present invention was devised in light of the above-described problems of the conventional technology and it is an object of this invention to provide a storage subsystem and its load distribution method capable of executing data processing by using a normal resource(s) even if abnormality occurs in part of a plurality of data processing resources that intermediate data processing between a host computer and a storage device.

Solution to Problem

In order to achieve the above-described object, the present invention provides a storage subsystem including a plurality of storage apparatuses connected to a host computer via a network, and a storage device having a plurality of storage units wherein the plurality of storage apparatuses functioning as data processing resources are configured by being divided into a plurality of systems and each storage apparatus is constituted from a controller for controlling data input to, or output from, the storage device based on a command from the host computer, an interface module for sending or receiving information to or from the host computer, and a subordinate interface for sending or receiving data to or from the storage device or the controller; wherein the storage apparatus of each system is connected to each other via a data transfer path connecting a storage apparatus of a local system and a storage apparatus of another system; and if abnormality occurs in the interface module belonging to the storage apparatus of the local system or the subordinate interface belonging to the storage apparatus of the local system, the controller for the storage apparatus of each system selects a normal resource from among the interface module belonging to the storage apparatus of the local system or the subordinate interface belonging to the storage apparatus of the local system, as a resource to be used for processing after the occurrence of the abnormality, executes processing of a command for the local system issued from the host computer after the occurrence of the abnormality, by using the selected resource, and requests the storage apparatus of the other system via the data transfer path to execute part of the processing of the command for the local system.

Advantageous Effects of Invention

Even if abnormality occurs in part of data processing resources, it is possible to execute data processing by utilizing normal resources according to the present invention.

BRIEF DESCRIPTION OF DRAWINGS

FIG. 1 is a block configuration diagram showing the overall configuration of a computer system.

FIG. 2 is a configuration diagram of a memory map.

FIG. 3 is a configuration diagram of local memories.

FIG. 5 is a configuration diagram of a logical unit/CPU association table.

FIG. 6 is a configuration diagram of a logical unit/physical drive association table.

FIG. 7 is a configuration diagram of a configuration site information table.

FIG. 8 is a configuration diagram of an information management table.

FIG. 9 is a configuration diagram of a vector allocation table.

DESCRIPTION OF EMBODIMENTS

Embodiments

Figure 4:
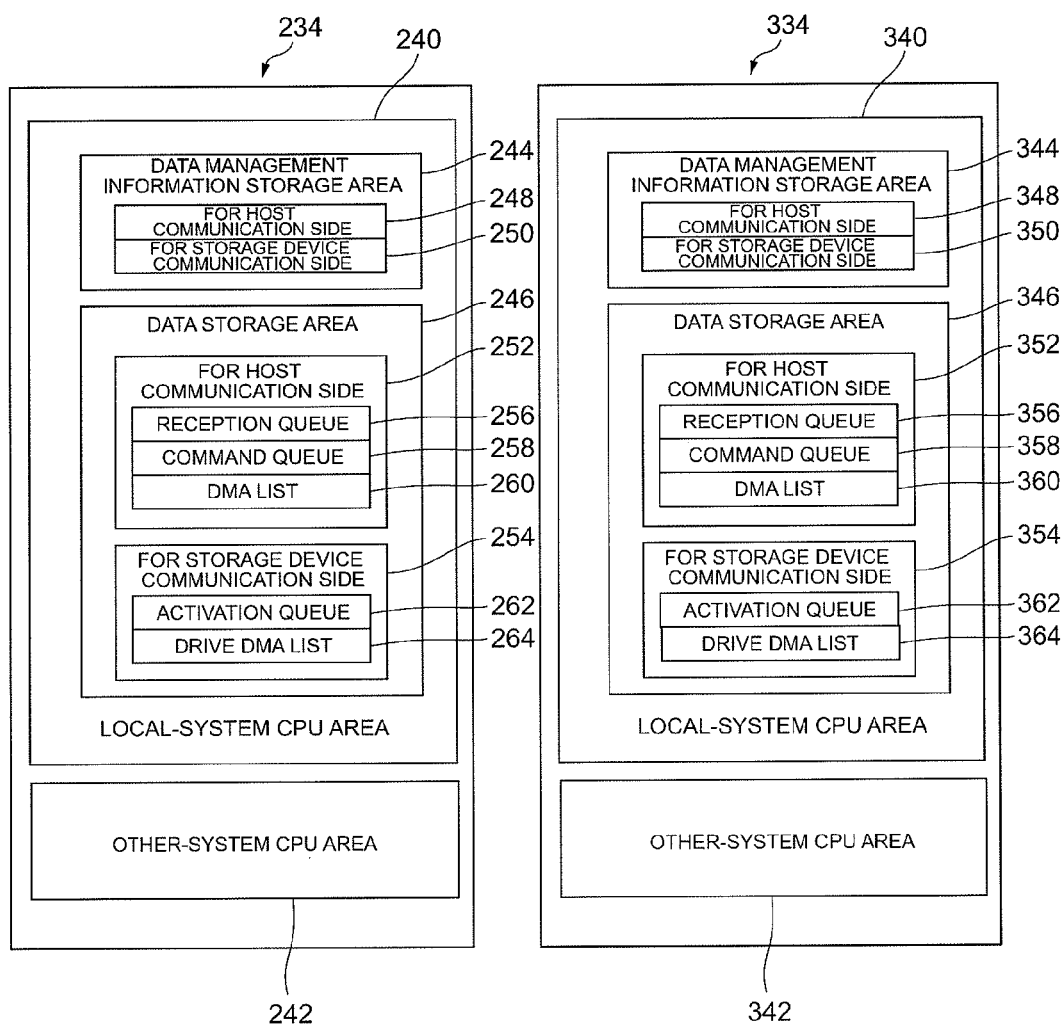
FIG. 4 is a configuration diagram of a local memory information table storage area.

An embodiment of the present invention will be explained below with reference to the attached drawings.

This embodiment is designed so that if abnormality occurs in a host communication control unit or a storage device communication control unit which belongs to any one of a plurality of storage apparatuses, processing of a command issued by a host computer is executed after the occurrence of abnormality by using normal resources from among a plurality of resources constituting each storage apparatus.

Overall Configuration

FIG. 1 is a block configuration diagram of a computer system showing an embodiment of the present invention. Referring to FIG. 1, the computer system includes a plurality of host computers 10, 12 and a storage subsystem 14 and each host computer 10, 12 and the storage subsystem 14 are connected via a network 16.

Incidentally, for example, an FC SAN (Fibre Channel Storage Area Network), an IP SAN (Internet Protocol Storage Area Network), a LAN (Local Area Network), or a WAN (Wide Area Network) can be used as the network 16.

The host computer 10, 12 is a computer device equipped with information processing resources such as a CPU (Central Processing Unit) and a memory, and is composed of, for example, a personal computer, a workstation, or a mainframe. The host computer 10, 12 is provided with a communication port (not shown) for the host computer 10, 12 to access the storage subsystem 14. The CPU of each host computer 10, 12 can send, for example, a write command or a read command via the communication port to the storage subsystem 14 in accordance with programs stored in the memory.

The storage subsystem 14 is constituted from a basic chassis 18 and an expansion chassis 20.

The basic chassis 18 contains a storage apparatus 22 and a storage apparatus 24 as a plurality of storage apparatuses and the expansion chassis 20 contains a storage device 26.

The storage apparatuses 22, 24 are configured so that they are divided into a plurality of systems (#0, #1) as data processing resources that intermediate data processing between the host computers 10, 12 and the storage device 26.

The storage apparatus 22 of the system #0 is constituted from a plurality of host communication control units 28, a controller 30, and a plurality of storage device communication control units 32; and the respective elements are connected to each other in such a manner that they can be freely attached to, or detached from, other elements. The storage apparatus 24 of the system #1 is constituted from a plurality of host communication control units 34, a controller 36, and a plurality of storage device communication control units 38; and the respective elements are connected to each other in such a manner that they can be freely attached to, or detached from, other elements. The controller 30 and the controller 36 are connected via a data transfer path 40.

The host communication control unit 28, 34 is configured as an interface module for sending/receiving information to/from the host computer 10, 12 via the network 16. The host communication control unit 28 has a plurality of ports 42, 44, and the host communication control unit 34 has a plurality of ports 46, 48, and each port 42 to 48 is connected to the network 16.

Each port 40 to 46 is assigned a unique network address, such as an IP (Internet Protocol) address or a WWN (World Wide Network), as a network address to connect the controller 30, 36 to the network 16. Incidentally, the host communication control unit 28, 34 is provided with a plurality of host communication protocol registers (not shown) as registers for storing information when sending/receiving information to/from the host computer 10, 12.

The controller 30 of the system #0 is constituted from a CPU 50, a local memory 52, a bridge 54, a data transfer unit 56, a temporary storage control unit 58, and a cache memory 60.

The CPU 50 is composed of a microprocessor for supervising and controlling the entire controller 30.

The local memory 52 is composed of a volatile memory and the local memory 52 stores information about a memory map and various tables.

The bridge 54 is configured as a relay device for connecting the CPU 50, the local memory 52, and the data transfer unit 56 to each other.

The data transfer control unit 56 is connected to the host communication control unit 28, the storage device communication control unit 32, the bridge 54, the cache memory 60, and the controller 36 of the other system, recognizes these connected sites as transfer targets, and controls data transfer to the transfer targets.

The temporary storage control unit 58 temporarily stores information when the CPU 50 accesses the host communication control unit 28 or the storage device communication control unit 32 and is also configured as an abnormality judgment unit that communicates with the host communication control unit 28 or the storage device communication control unit 32, judges whether or not abnormality exists in the host communication control unit 28 or the storage device communication control unit 32, and then notifies the CPU 50 of the judgment result.

The cache memory 60 is a nonvolatile memory and temporarily stores data by data processing of the CPU 50.

The storage device communication control unit 32 is configured as a subordinate interface for sending/receiving data to/from the storage device 26 and is provided with a plurality of storage device communication protocol registers (not shown) as registers for storing information when sending/receiving data to/from the storage device 26.

The controller 36 of the system #1 is constituted from a CPU 70, a local memory 72, a bridge 74, a data transfer control unit 76, a temporary storage control unit 78, and a cache memory 80.

The CPU 70 is composed of a microprocessor for supervising and controlling the entire controller 36.

The local memory 72 is composed of a volatile memory and the local memory 72 stores information about a memory map and various tables.

The bridge 74 is configured as a relay device for connecting the CPU 70, the local memory 72, and the data transfer unit 76 to each other.

The data transfer control unit 76 is connected to the host communication control unit 34, the storage device communication control unit 38, the bridge 74, the cache memory 80, and the controller 30 of the other system, recognizes these connected sites as transfer targets, and controls data transfer to the transfer targets.

The temporary storage control unit 78 temporarily stores information when the CPU 70 accesses the host communication control unit 34 or the storage device communication control unit 38 and is also configured as an abnormality judgment unit that communicates with the host communication control unit 34 or the storage device communication control unit 38, judges whether or not abnormality exists in the host communication control unit 34 or the storage device communication control unit 38, and then notifies the CPU 70 of the judgment result.

The cache memory 80 is composed of a nonvolatile memory and temporarily stores data by data processing of the CPU 70.

The storage device communication control unit 38 is configured as a subordinate interface for sending/receiving data to/from the storage device 26 and is provided with a plurality of storage device communication protocol registers (not shown) as registers for storing information when sending/receiving data to/from the storage device 26.

The storage device 26 is constituted from a plurality of bridges 90, 92 and a plurality of storage units 94. The bridge 90 is connected to the storage device communication control unit 32, the bridge 92 is connected to the storage device communication control unit 38, and the plurality of storage units 94 are connected to the bridges 90, 92, respectively. The bridge 90 is configured as a relay device connecting the storage device communication control unit 32 and each storage unit 94 and the bridge 92 is configured as a relay device connecting the storage device communication control unit 38 and each storage unit 94.

For example, HDDs (Hard Disk Drives) can be used as each storage unit 94. If HDDs are used as the storage units, for example, FC (Fibre Channel) disks, SCSI (Small Computer System Interface) disks, SATA (Serial ATA) disks, ATA (AT Attachment) disks, or SAS (Serial Attached SCSI) disks can be used. Incidentally, HDDs may be hereinafter referred to as drives.

Besides HDDs, for example, semiconductor memory devices, optical disk devices, magneto-optical disk devices, magnetic tape devices, and flexible disk devices can be used as each storage unit 94.

Furthermore, each storage unit 94 can constitute a RAID (Redundant Array of Inexpensive Disks) group such as RAID4, RAID5, or RAID6 and each storage unit 94 can be divided into a plurality of RAID groups. Under this circumstance, a plurality of logical units (hereinafter sometimes referred to as LUs (Logical Units)) or a plurality of logical volumes can be formed in a physical storage area of each storage unit 94.

The logical units (LUs) are logical units provided as access targets of the host computers 10, 12 from the storage apparatuses 22, 24 to the host computers 10, 12.

Next, FIG. 2 shows a configuration diagram of a memory map. Referring to FIG. 2, a memory map 100 is a map that defines an address range for the CPUs 50, 70 to access the access targets (the local memories 52, 72, the cache memories 60, 80, the host communication control units 28, 34, and the storage device communication control units 32, 38); is configured as a memory space as seen from the CPUs 50, 70; and is constituted from an address field 102 and a memory map field 104.

The address is an address used by the CPU 50, 70 to access the relevant access targets and an entry of the address field 102 stores information defining the address range. The memory map is a name for identifying the relevant access target of the CPU 50, 70 and an entry of the memory map field 104 stores information about the name for identifying the access target of the CPU 50, 70.

For example, a first entry of the address field 102 stores AAAAA-BBBBB as the address range for the CPU 50 to access the local-system local memory (the local memory 52) and a first entry of the memory map field 104 stores information indicating the local-system local memory. Furthermore, an eighth entry stores information indicating SSSSS-TTTTT as information for the CPU 50 to access the other-system local memory (the local memory 72).

Incidentally, in the case of the CPU 50, the local system means elements constituting the storage apparatus 22 of the system #0 (the host communication control unit 28, the controller 30, and the storage device communication control unit 32); and the other system means elements constituting the storage apparatus 24 of the system #1 (the host communication control unit 34, the controller 36, and the storage device communication control unit 38). Also, in the case of the CPU 70, the local system means elements constituting the storage apparatus 24 of the system #1; and the other system means elements constituting the storage apparatus 22 of the system #0.

Next, FIG. 3 shows a configuration diagram of the local memories.

Referring to FIG. 3, the local memory 52 has a host communication side area 200, a storage device communication side area 202, and a common area 204; and the local memory 72 has a host communication side area 300, a storage device communication side area 302, and a common area 304.

The host communication side area 200 is configured as an area for storing control information and programs to be processed by the CPU 50, using the host communication control unit 28; and is constituted from a local-system control (CTL) reception command storage area 206 and another-system control (CTL) reception command storage area 208.

The local-system control reception command storage area 206 is constituted from a control information storage area 210 and a processing-to-be-executed storage area 212; and the other-system control reception command storage area 208 is constituted from a control information storage area 214 and a processing-to-be-executed storage area 216.

The control information storage area 210 stores control information of the controller 30. This control information is information for the controller 30 to control a transfer destination of read data or write data based on a command received from the host computer 10, 12.

The processing-to-be-executed storage area 212 stores, for example, a read/write processing program and a data transfer program as programs to be executed by the controller 30.

The control information storage area 214 stores control information used by the controller 36 of the other system. The processing-to-be-executed storage area 216 stores information about processing programs to be executed by the controller 36 of the other system.

The storage device communication side area 202 is constituted from a primary path command storage area 218 and a secondary path command storage area 220.

The primary path command storage area 218 is constituted from a control information storage area 222 and a processing-to-be-executed storage area 224 and the secondary path command storage area 220 is constituted from a control information storage area 226 and a processing-to-be-executed storage area 228.

The storage device communication side area 202 is an area for storing control information and processing programs for the controller 30 to control data input to, or output from, the storage device 26 by using the storage device communication control unit 32.

Now, if main access targets of the controller 30 are, for example, the storage units 94 at the even-numbered positions from among the plurality of storage units 94, paths connecting the storage units 94 at the even-numbered positions and the storage device communication control unit 32 are primary paths and paths connecting the storage units 94 at the odd-numbered positions and the storage device communication control unit 32 are secondary paths from among a plurality of paths connecting the respective storage units 94 and the storage device communication control unit 32.

When the plurality of paths connecting the storage device communication control unit 32 and the respective storage units 94 are divided into the primary paths and the secondary paths, the control information storage area 222 stores control information for the controller 30 to control data input to, or output from, the storage units 94 via the primary paths. The processing-to-be-executed storage area 224 stores, for example, a read/write processing program and a data transfer program as processing programs to be executed by the controller 30 by using the primary paths.

On the other hand, the control information storage area 226 stores control information for the controller 30 to execute data processing by using the secondary paths. The processing-to-be-executed storage area 228 stores, for example, a read/write processing program and a data transfer program as processing programs to be executed by the controller 30 by using the secondary paths.

The common area 204 is constituted from a plurality of table storage areas 230, 232, 234, 236.

The table storage area 230 stores a logical unit/CPU association table, the table storage area 232 stores a logical unit/physical drive association table, the table storage area 234 stores a local memory information table, and the table storage area 236 stores a configuration site information table.

Meanwhile, the host communication side area 300 is configured as an area for storing control information and programs to be processed by the CPU 70 by using the host communication control unit 34 and is constituted from a local-system control (CTL) reception command storage area 306 and another-system control (CTL) reception command storage area 308.

The local-system control reception command storage area 306 is constituted from a control information storage area 310 and a processing-to-be-executed storage area 312 and the other-system control reception command storage area 308 is constituted from a control information storage area 314 and a processing-to-be-executed storage area 316.

The control information storage area 310 stores control information of the controller 36. This control information is information for the controller 36 to control a transfer destination of read data or write data based on a command received from the host computer 10, 12.

The processing-to-be-executed storage area 312 stores, for example, a read/write processing program and a data transfer program as programs to be executed by the controller 36.

The control information storage area 314 stores control information used by the controller 30 of the other system. The processing-to-be-executed storage area 316 stores information about processing programs to be executed by the controller 30 of the other system.

The storage device communication side area 302 is constituted from a primary path command storage area 318 and a secondary path command storage area 320.

The primary path command storage, area 318 is constituted from a control information storage area 322 and a processing-to-be-executed storage area 324 and the secondary path command storage area 320 is constituted from a control information storage area 326 and a processing-to-be-executed storage area 328.

The storage device communication side area 302 is an area for storing control information and processing programs for the controller 36 to control data input to, or output from, the storage device 26 by using the storage device communication control unit 38.

Now, if main access targets of the controller 36 are, for example, the storage units 94 at the even-numbered positions from among the plurality of storage units 94, paths connecting the storage units 94 at the odd-numbered positions and the storage device communication control unit 38 are primary paths and paths connecting the storage units 94 at the even-numbered positions and the storage device communication control unit 38 are secondary paths from among a plurality of paths connecting the respective storage units 94 and the storage device communication control unit 38.

If the access target of the controller 36 and the access target of the controller 30 are the same storage unit 94 under this circumstance, the controller 36 uses the primary path to access that storage unit 94 and the controller 30 uses the secondary path to access that storage unit 94.

When the plurality of paths connecting the storage device communication control unit 38 and the respective storage units 94 are divided into the primary paths and the secondary paths, the control information storage area 322 stores control information for the controller 36 to control data input to, or output from, the storage units 94 via the primary paths. The processing-to-be-executed storage area 324 stores, for example, a read/write processing program and a data transfer program as processing programs to be executed by the controller 36 by using the primary paths.

On the other hand, the control information storage area 326 stores control information for the controller 36 to execute data processing by using the secondary paths. The processing-to-be-executed storage area 328 stores, for example, a read/write processing program and a data transfer program as processing programs to be executed by the controller 36 by using the secondary paths.

The common area 304 is constituted from a plurality of table storage areas 330, 332, 334, 336.

The table storage area 330 stores a logical unit/CPU association table, the table storage area 332 stores a logical unit/physical drive association table, the table storage area 334 stores a local memory information table, and the table storage area 336 stores a configuration site information table.

Next, FIG. 4 shows a configuration diagram of the table storage areas storing the local memory information tables.

Referring to FIG. 4, the table storage area 234 for storing the local memory information table is constituted from a local-system CPU area 240 and another-system CPU area 242; and the table storage area 334 for storing the local memory information table is constituted from a local-system CPU area 340 and another-system CPU area 342.

The local-system CPU area 240 is constituted from a data management information storage area 244 and a data storage area 246.

The data management information storage area 244 is constituted from a host communication side area 248 and a storage device communication side area 250.

The host communication side area 248 stores data management information for the CPU 50 to send/receive data to/from the host communication control unit 28 and the storage device communication side area 250 stores data management information for the CPU 50 to send/receive data to/from the storage device communication control unit 32.

The data storage area 246 is constituted from a host communication side area 252 and a storage device communication side area 254.

The host communication side area 252 stores a reception queue 256, a command queue 258, and a DMA (data management access) list 260.

The storage device communication side area 254 stores an activation queue 262 and a drive DMA list 264.

The DMA list 260 is information indicating at which position in the cache memory 60 the relevant read data or write data is stored. The drive DMA list 264 is information indicating at which position in the cache memory 60 the relevant read data which has been read from the storage unit 94 is stored.

On the other hand, the local-system CPU area 340 is constituted from a data management information storage area 344 and a data storage area 346.

The data management information storage area 344 is constituted from a host communication side area 348 and a storage device communication side area 350.

The host communication side area 348 stores data management information for the CPU 70 to send/receive data to/from the host communication control unit 34 and the storage device communication side area 350 stores data management information for the CPU 70 to send/receive data to/from the storage device communication control unit 38.

The data storage area 346 is constituted from a host communication side area 352 and a storage device communication side area 354.

The host communication side area 352 stores a reception queue 356, a command queue 358, and a DMA (data management access) list 360.

The storage device communication side area 354 stores an activation queue 362 and a drive DMA list 364.

The DMA list 360 is information indicating at which position in the cache memory 80 the relevant read data or write data is stored. The drive DMA list 364 is information indicating at which position in the cache memory 80 the relevant read data which has been read from the storage unit 94 is stored.

Next, FIG. 5 shows a configuration diagram of a logical unit/CPU association table.

Referring to FIG. 5, a logical unit/CPU association table 400 is a table for the controller 30, 36 to judge which controller should take charge of processing of a command when the command is received from the host computer 10, 12; and is stored in the table storage area 230, 330 for the local memory 52, 72.

The logical unit/CPU association table 400 is constituted from an LU number field 402, a controller-in-charge number field 404, and a processing flag field 406. The LU number is information added to a command and is an identifier for uniquely identifying a logical unit (LU). Each entry of the LU number field 402 stores the identifier for identifying each logical unit. For example, in a case of a logical unit of the system #0, the LU number field 402 stores 0; and in a case of a logical unit of the system #1, the LU number field 402 stores 1.

The controller-in-charge number is information about the number of the controller in charge of each logical unit. Specifically speaking, the controller-in-charge number is information about the number of the controller in charge of processing for accessing each logical unit. Each entry of the controller-in-charge number field 404 stores the number of the controller in charge of each logical unit. For example, the controller-in-charge number field 404 stores CTL0 as the number of the controller 30 of the system #0 in change of the logical unit #0. Furthermore, the controller-in-charge number field 404 stores CTL1 as the number of the controller 36 of the system #1 in charge of the logical unit #1.

The processing flag is information indicating the processing status of the controller 30 or the controller 36. When the controller 30 or the controller 36 is executing I/O processing, an entry of the processing flag field 406 stores IN PROCESS. When the controller 30 or the controller 36 is not executing the I/O processing, the processing flag field 406 stores information indicating NO I/O.

Next, FIG. 6 shows a configuration diagram of a logical unit/physical drive association table.

Referring to FIG. 6, a logical unit/physical drive association table 500 is a table for judging which path, either the primary path or the secondary path, the storage device communication control unit 32 or the storage device communication control unit 38 should use; and is stored in the table storage area 232 of the local memory 52 or the table storage area 332 of the local memory 72.

The logical unit/physical drive association table 500 is constituted from an LU number field 502, a pool flag field 504, an RG (RAID group) number field 506, a pool number field 508, a unit number field 510, a drive number field 512, and a controller-in-charge-of-primary-path number field 514.

The LU number is the number for uniquely identifying a logical unit (LU). Each entry of the LU number field 502 stores the number for identifying each logical unit, for example, 0 in a case of a logical unit of the system #0, and 1 in a case of a logical unit of the system #1.

The pool flag is information indicating whether each logical unit uses a pool or not. If the relevant logical unit uses a pool, each entry of the pool flag field 504 stores information stating USED; and If the relevant logical unit does not use a pool, each entry of the pool flag field 504 stores information stating UNUSED.

The RG number is the number assigned to each RAID group when each storage unit 94 is divided into RAID groups. If the relevant logical unit does not belong to a RAID group, each entry of the RG number field 506 stores information-; and If the relevant logical unit belongs to, for example, a RAID group #0, each entry of the RG number field 506 stores information indicating 0.

The pool number is the number for identifying a pool. If the relevant logical unit uses a pool, each entry of the pool number field 508 stores information about the pool number, for example, 256.

The unit number is information about the number of a unit to which the relevant logical unit belongs. For example, if the relevant logical unit belongs to unit #0, each entry of the unit number field 510 stores information indicating 0; and if the relevant logical unit belongs to unit #1, each entry of the unit number field 510 stores information indicating 1.

The drive number is the number for identifying each storage unit 94. Each entry of the drive number field 512 stores the number of the storage units 94 constituting the relevant logical unit. For example, if the logical unit #0 is constituted from the storage units 94 #0 to #4, the relevant entry of the logical unit #0 stores 0, 1, 2, 3, 4.

The controller number in charge of the primary path is information about the number of a controller in charge accessing the relevant logical unit by using the primary path. Each entry of the controller-in-charge-of-primary-path number field 514 stores the number of the controller accessing the relevant logical unit by using the primary path. For example, if the controller accessing the logical unit #0 by using the primary path is the controller 30 of the system #0, an entry corresponding to the logical unit #0 stores CTL0. If the controller accessing a logical unit #5 by using the primary path is the controller 36 of the system #1, an entry corresponding to the logical unit #5 stores information CTL1.

Next, FIG. 7 shows a configuration diagram of a configuration site information table.

Referring to FIG. 7, a configuration site information table 600 is a table for the CPU 50, 70 to judge whether abnormality exists or not in the access target; and is stored in the table storage area 236 of the local memory 52 or the table storage area 336 of the local memory 72.

The configuration site information table 600 is constituted from a mounted CTL number field 602, a type field 604, an I/F (InterFace) number field 606, and a status field 608.

The mounted CTL number is information about the number for identifying a controller mounted on the basic chassis 18. Each entry of the mounted CTL number field 602 stores 0 corresponding to the controller 30 of the system #0 and 1 corresponding to the controller 36 of the system #1 as the number for identifying the controllers 30, 36 mounted on the basic chassis 18.

The type is information used by the CPU 50, 70 to identify the access target or communication target. For example, if the access target of the CPU 50 of the system #0 is the host communication control unit 28, each entry of the type field 604 stores information indicating the host communication control unit.

The I/F number is the number for identifying the host communication control unit 28, 34 or the storage device communication control unit 32, 38. For example, if the access target of the CPU 50 of the system #0 is the host communication control unit 28, each entry of the I/F number field 606 stores 0; and if the access target of the CPU 50 of the system #0 is the host communication control unit 34, each entry of the I/F number field 606 stores 1.

The status is information indicating whether the status of the host communication control unit 28, 34 or the storage device communication control unit 32, 38 is normal or abnormal. For example, If the host communication control unit 28 is normal, an entry of the status field 608 stores information indicating NORMAL; and if the storage device communication control unit 38 is abnormal, an entry of the status field 608 stores information indicating ABNORMAL.

The content of the configuration site information table 600 is updated by update processing of the CPU 50 or the CPU 70.

Next, FIG. 8 shows a configuration diagram of an information management table 700.

Referring to FIG. 8, the information management table 700 is a table for managing information stored in the temporary storage control unit 58 or the temporary storage control unit 78 and is stored in the temporary storage control unit 58 or the temporary storage control unit 78.

The information management table 700 is constituted from an execution controller number field 702, an area location field 704, a reading result field 706, a read location address field 708, and a read data field 710.

The execution controller number is information about the number of the controller accessing the temporary storage control unit 58 or the temporary storage control unit 38. If the controller 30 of the system #0 accesses the temporary storage control unit 58 or the temporary storage control unit 38, each entry of the execution controller number field 702 stores information indicating CTL0; and if the controller 36 of the system #1 accesses the temporary storage control unit 58 or the temporary storage control unit 38, each entry of the execution controller number field 702 stores information indicating CTL1.

The area location is information for identifying whether the controller of the local system or the controller of the other system uses an area of the temporary storage control unit 38 or the temporary storage control unit 38. If the controller of the local system uses the area, each entry of the area location field 702 stores information indicating For Local System; and if the controller of the other system uses the area, each entry of the area location field 702 stores information indicating For The Other System.

The reading result is information indicating the result read by the temporary storage control unit 58 or the temporary storage control unit 78 from the read location. If the reading result of the temporary storage control unit 58 or the temporary storage control unit 78 is successful, an entry of the reading result field 706 stores information indicating SUCCESS; and if the reading result of the temporary storage control unit 58 or the temporary storage control unit 78 is a failure, an entry of the reading result field 706 stores information indicating FAILURE. Incidentally, if the reading result has not been obtained yet, an entry of the reading result field 706 stores information indicating BEING EXECUTED.

The read location address is information about an address for identifying the read location of the temporary storage control unit 58 or the temporary storage control unit 78. For example, if the read location of the temporary storage control unit 58 is the host communication control unit 28, each entry of the read location address field 708 stores information indicating Local-system Host Communication Control Unit.

The read data is information about data read by the temporary storage control unit 58 or the temporary storage control unit 78 from the read location. For example, if the read data is DDDD, each entry of the read data field 710 stores DDDD. If the read data is invalid data, each entry of the read data field 710 stores INVALID DATA. If the processing is being executed, data cannot be obtained and, therefore, each entry of the read data field 710 stores information indicating.

Next, FIG. 9 shows a configuration diagram of a vector allocation table.

Referring to FIG. 9, a vector allocation table 800 is a table for storing information registered when the storage apparatus 22 or the storage apparatus 24 is started; and is stored in the local memory 52 or the local memory 72.

The vector allocation table 800 is constituted from a vector number field 802, a content field 804, and a priority field 806.

The vector number is information about the number for identifying an interrupt occurrence source when interrupt processing occurs in the CPU 50 or the CPU 70. Each entry of the vector number field 802 stores, for example, AAA or aaa as the number for identifying the interrupt occurrence source.

The content is information indicating the content of the interrupt processing identified with the vector number. For example, if abnormality occurs in the host communication control unit 28, each entry of the content field 804 stores information stating a Fault of I/F #0 of the Host Communication Control Unit.

The priority is information for identifying the priority of the interrupt processing. Each entry of the priority field 806 stores, for example, information 1 to 16 and 17 as the number regarding the priority of the interrupt processing to be executed by the CPU 50, 70.

Figure 10:
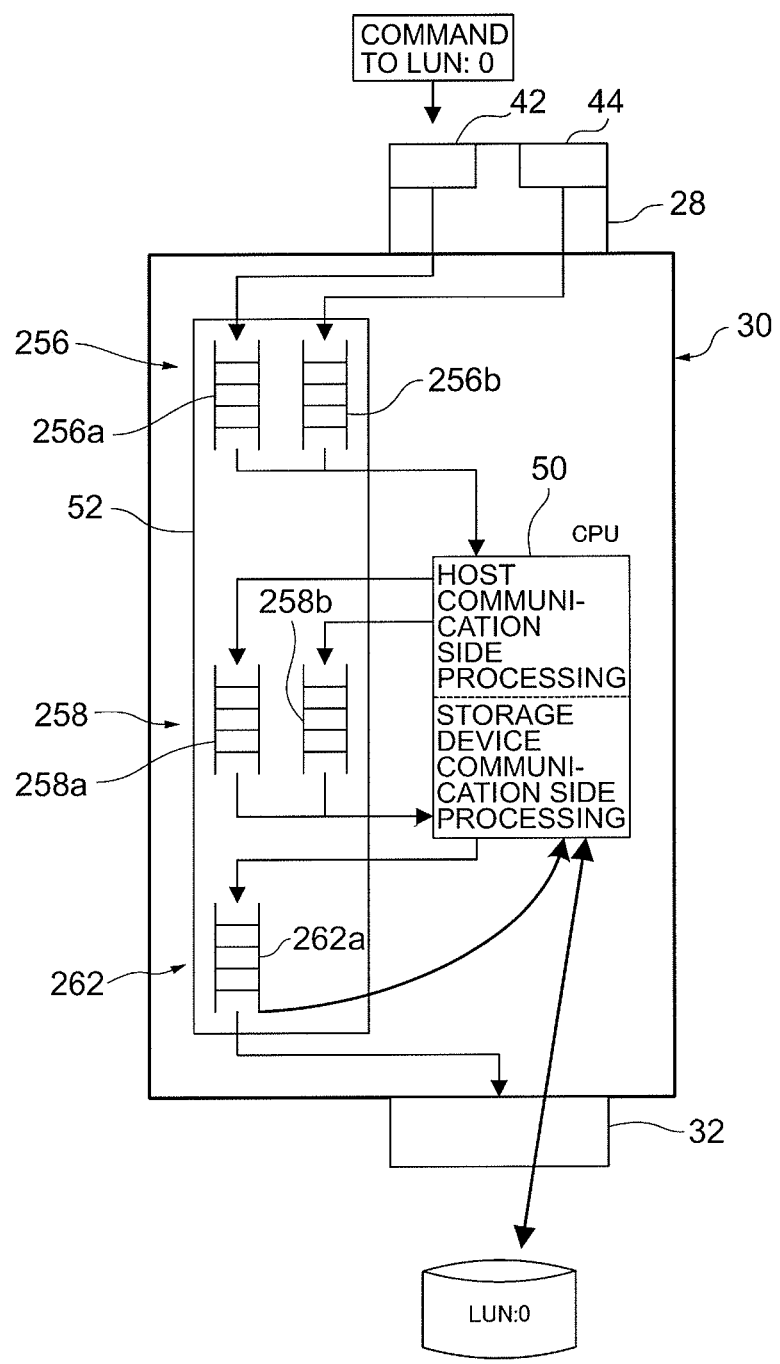
FIG. 10 is a logical configuration diagram of the local memory when a reception port is identical to a controller in charge of LUs.

Next, FIG. 10 shows a logical configuration diagram of the local memory when the reception port is identical to the controller in charge of LUs.

The local memory 52, 72 has a queue configuration as a work area used by the CPU 50, 70 to sequentially process commands sent from the host computer 10, 12.

The processing content of the controller 30 will be hereinafter explained by using the queue configuration of the local memory 52 when the reception port is identical to the controller in charge of LUs, for example, when the host communication control unit 28 receives a command to the logical unit LU0 of the system #0 (LUN:0) as an access location and the controller 30 processes the received command.

The local memory 52 has reception queues 256a, 256b for receiving commands issued from the host computers 10, 12. The reception queue 256a stores commands issued from the host computer 10 via the port (reception port) 42 and the reception queue 256b stores commands issued from the host computer 10 via the port 44. As host communication side processing, the CPU 50 fetches the commands stored in the reception queues 256a, 256b by means of round robin and then sequentially transfers the fetched commands to command queues 258a, 258b. The command queues 258a, 258b sequentially store the commands transferred by the host communication side processing of the CPU 50.

As storage device communication side processing, the CPU 50 sequentially fetches the commands stored in the command queues 258a, 258b by means of round robin, sequentially selects a command to be activated from among the fetched commands, and stores the selected command in the activation queue 262a. The CPU 50 sequentially activates the commands stored in the activation queue 262a and executes read access or write access to the logical unit LU0 of the system #0 via the storage device communication control unit 32.

In this case, since the reception port and the controller in charge of LUs are identical to each other, the controller 30 belonging to the storage apparatus 22 executes processing to be executed when receiving a command for the local system (command to the logical unit LU0 of the system #0 (LUN: 0) as the access location), which should be processed by the storage apparatus 22 of the local system, as a command from the host computer 10.

Incidentally, the controller 30 is a controller for processing the logical unit LU0 of the system #0 and the storage device communication control unit 32 and the logical unit LU0 of the system #0 are connected via the primary path.

Figure 11:
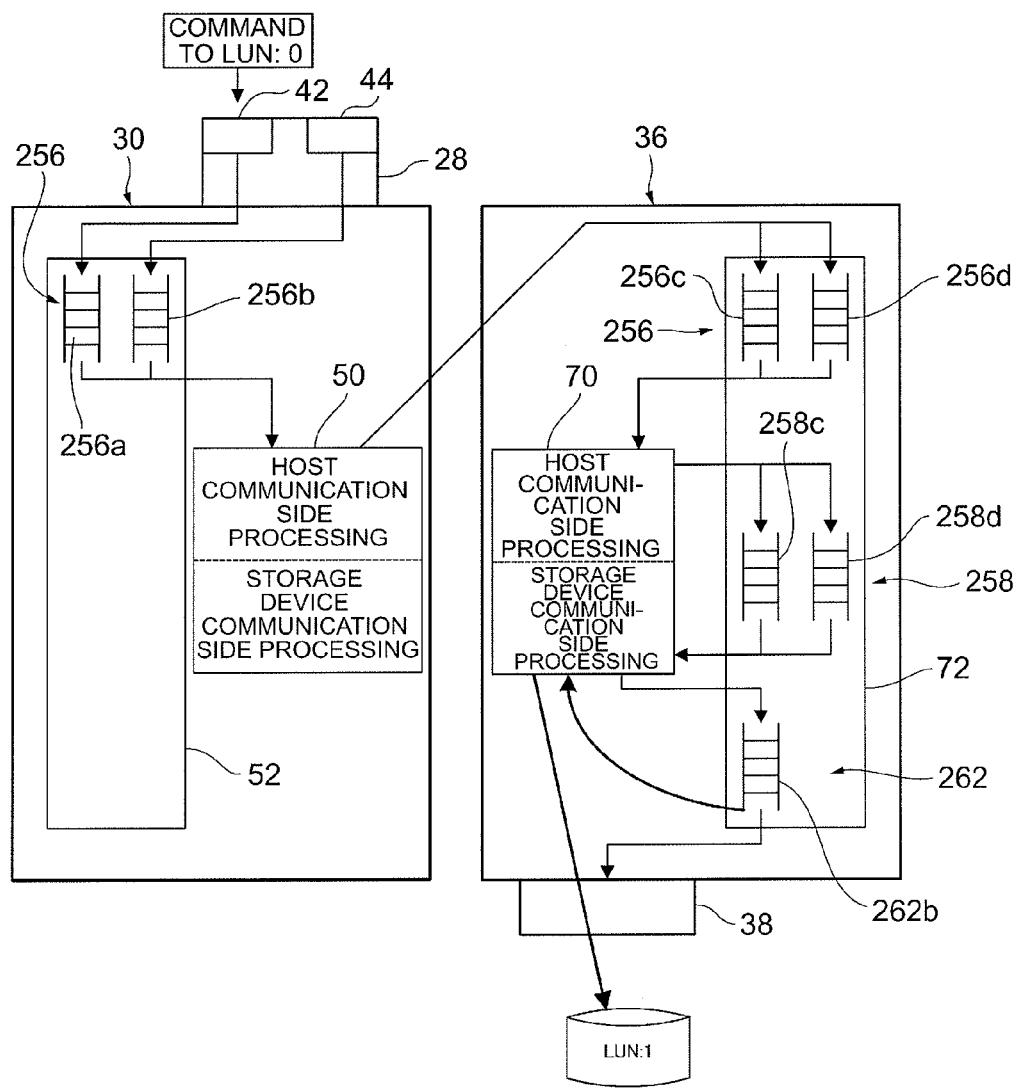
FIG. 11 is a logical configuration diagram of the local memory when the reception port is not identical to the controller in charge of LUs.

Next, FIG. 11 shows a logical configuration diagram of the local memory when the reception port is not identical to the controller in charge of LUs.

An example where the controller 30 is a controller for processing the logical unit #0 (not shown) and the controller 36 is a controller for processing the logical unit LU1 of the system #1 (LUN:1) will be explained.

When a command to the logical unit LU1 of the system #1 is input to the port (reception port) 42, this command is stored in, for example, the reception queue 256a. The CPU 50 analyzes the content of the command stored in the reception queue 256a by the host communication side processing; and if it is determined that the command is a command for accessing the logical unit LU1 of the system #1, the controller in charge of the logical unit LU1 of the system #1 is the controller of the other system, so the CPU 50 transfers the received command to the controller 36 via the data transfer path 40.

The command transferred from the controller 30 side is stored in the reception queue 256c or the reception queue 256d of the local memory 72.

The CPU 70 sequentially fetches the commands stored in the reception queue 256c or 256d by means of round robin in accordance with the host communication side processing and stores the fetched commands in the command queue 258c or the command queue 258d.

Then, the CPU 70 fetches the commands stored in the command queue 258c or 258d by means of round robin as the storage device communication side processing and stores the fetched commands in the activation queue 262b.

Subsequently, the CPU 70 activates the command stored in the activation queue 262b as a command using the primary path and executes read access or write access to the logical unit LU1 of the system #1 via the storage device communication control unit 38.

In this case, since the reception port is not identical to the controller in charge of LUs, the controller 30 belonging to the storage apparatus 22 requests the storage apparatus 24 of the other system via the data transfer path 40 to execute processing of a command for the other system as processing to be executed when receiving a command for the other system (command to access the logical unit LU1 of the system #1), which should be processed by the storage apparatus 24 of the other system, as a command from the host computer 10; and then the controller 36 belonging to the storage apparatus 24 of the other system will execute the processing of the command for accessing the logical unit LU1 of the system #1.

Next, processing to be executed when receiving a write command will be explained with reference to flowcharts in FIG. 12 to FIG. 14.

Firstly, processing on the host communication side when receiving a write command will be explained with reference to the flowchart in FIG. 12.

When the host communication control unit 28 receives a write command from, for example, the host computer 10 (S11), the host communication control unit 28 judges whether or not the controller 30 on the #0 side is in charge of processing of the target LU, based on the write command (S12); and if an affirmative judgment result is obtained in this step, the host communication control unit 28 transfers the write command to the CPU 50.

Next, the CPU 50 stores the received write command in the local memory 52 (S13), then recognizes the received write command (S14), creates a DMA list for identifying a write location of the write command based on the received write command and stores the created DMA list in the local memory 52 (S15).

Subsequently, the CPU 50 activates the host communication control unit 28 via the data transfer control unit 56 (S16) and judges whether the activation of the host communication control unit 28 has failed or not (S17).

If the CPU 50 determines that the activation of the host communication control unit 28 has failed, it proceeds to processing (B) for the case where the activation has failed; and if it is determined that the host communication control unit 28 has been activated successfully, the CPU 50 monitors the processing of the host communication control unit 28.

In this case, the host communication control unit 28 obtains the DMA list from the local memory 52 via the data transfer control unit 56 and transfers the obtained DMA list to the data transfer unit (S18). The data transfer control unit 56 stores write data in the cache memory 60 in accordance with the received DMA list (S19), further executes processing for storing the write data in the cache memory 80 on the #1 side via the data transfer path 40, and performs dual writing of the write data (S20).

Subsequently, the data transfer control unit 56 notifies the CPU 50 of data transfer termination (S21) and the CPU 50 reports write processing completion to the host computer 10 via the host communication control unit 28 (S22). Next, the CPU 50 destages the write data from the cache memory 60 (S23) and proceeds to processing (A) on the storage device communication side.

On the other hand, if a negative judgment result is obtained in step S12, the CPU 50 executes processing for storing the write command in the local memory 72 on the #1 side (S24) and transfers the write command via the data transfer path 40 to the CPU 70.

When the CPU 70 receives the write command, it recognizes the reception of the write command (S25), creates a DMA list for identifying a storage location of the write command based on the received write command, stores the created DMA list in the local memory 72 (S26), and then activates the host communication control unit 28 via the data transfer control unit 76, the data transfer path 40, and the data transfer control unit 56 (S27).

Next, the CPU 70 judges whether the activation of the host communication control unit 28 has failed or not (S28). If the activation has failed, the CPU 70 proceeds to processing (B) for the case where the activation has failed; if the activation has been successfully performed, the CPU 70 monitors processing of the host communication control unit 28.

When the host communication control unit 28 is activated, the host communication control unit 28 obtains the DMA list from the local memory 72 via the data transfer control unit 56, the data transfer path 40, and the data transfer control unit 76 and transfers the obtained DMA list to the data transfer unit 56 (S29).

The data transfer control unit 56 stores the write data in the cache memory 60 in accordance with the received DMA list (S30), further executes processing for storing the write data in the cache memory 80 on the #1 side via the data transfer path 40 and the data transfer control unit 76, and performs dual writing of the write data (S31).

Subsequently, the data transfer control unit 56 notifies the CPU 70 via the data transfer path 40 of the data transfer termination (S32).

Then, when the CPU 70 receives the notice of data transfer termination, it reports the write processing completion to the host computer 10 via the data transfer control unit 76, the data transfer path 40, the data transfer control unit 56, and the host communication control unit 28 (S33). Subsequently, the CPU 70 destages the write data from the cache memory 80 and proceeds to processing (A) on the storage device communication side.

Next, processing on the storage device communication side when receiving a write command will be explained with reference to the flowchart in FIG. 13. This processing is executed after step S23 or step S34 in FIG. 12.

Firstly, the CPU 50 creates a drive DMA list for identifying a storage location of the write data based on the received write command, stores the created drive DMA list in the local memory 52 (S41), and judges whether or not the primary path of the target LU is on the 0 side based on the drive DMA list (S42).

Specifically speaking, the CPU 50 judges whether or not the primary path connecting the logical unit, which is the storage location of the write data, and the storage device communication control unit, from among a plurality of paths connecting logical units (LU) and the storage device communication control unit, is the primary path connecting the storage device communication control unit 32 of the system #0 and the target LU (the logical unit which is the storage location of the write data).

If an affirmative judgment result is obtained in step S42, the CPU 50 activates the storage device communication control unit 32 via the data transfer control unit 56 (S43) and judges whether the activation of the storage device communication control unit 32 has failed or not (S44).

If it is determined in step S44 that the activation has failed, the CPU 50 proceeds to processing (B) for the case where the activation has failed; and if the activation has been performed successfully, the CPU 50 monitors the processing of the storage device communication control unit 32.

When the storage device communication control unit 32 is activated, the storage device communication control unit 32 obtains the drive DMA list from the local memory 52 via the data transfer control unit 56 and transfers the obtained drive DMA list to the data transfer control unit 56 (S45).

Next, the data transfer control unit 56 reads the write data from the cache memory 60 in accordance with the received drive DMA list, executes processing for storing the write data, which has been read, in the storage unit 94 via the storage device communication control unit 32 (S46), and then notifies the CPU 50 of the data transfer termination (S47).

Subsequently, when the CPU 50 receives the notice of data transfer termination, it reports the write processing completion to the storage device 26 via the data transfer control unit 56 and the storage device communication control unit 32 (S48), thereby terminating the processing in this routine.

On the other hand, if a negative judgment result is obtained in step S42, the CPU 50 activates the storage device communication control unit 38 via the data transfer control unit 56, the data transfer path 40, and the data transfer control unit 76 (S49) and judges whether the activation of the storage device communication control unit 38 has failed or not (S50).

If it is determined in step S50 that the activation has failed, the CPU 50 proceeds to processing (B) for the case where the activation has failed; if the activation has been successfully performed, the CPU 50 monitors processing of the storage device communication control unit 38.

When the storage device communication control unit 38 is activated, the storage device communication control unit 38 obtains the drive DMA list from the local memory 52 via the data transfer control unit 76, the data transfer path 40, and the data transfer control unit 56 and transfers the obtained drive DMA list to the data transfer control unit 76 (S51).

Then, the data transfer control unit 76 reads the write data from the cache memory 80 in accordance with the received drive DMA list and executes processing for storing the write data, which has been read, in the storage unit 94 via the storage device communication control unit 38 (S52).

Subsequently, the storage device communication control unit 38 notifies the CPU 50 of the data transfer termination via the data transfer control unit 76, the data transfer path 40, and the data transfer control unit 56 (S53).

Then, when the CPU 50 receives the notice of data transfer termination, it reports the processing completion to the storage device 26 via the data transfer control unit 56, the data transfer path 40, the data transfer control unit 76, and the storage device communication control unit 38 (S54), thereby terminating the processing in this routine.

Next, processing executed when the activation has failed will be explained with reference to the flowchart in FIG. 14. This processing is executed when it is determined in each of steps S17 and S28 in FIG. 12 and steps S44 and S50 in FIG. 13 that the activation has failed.

Figure 12:
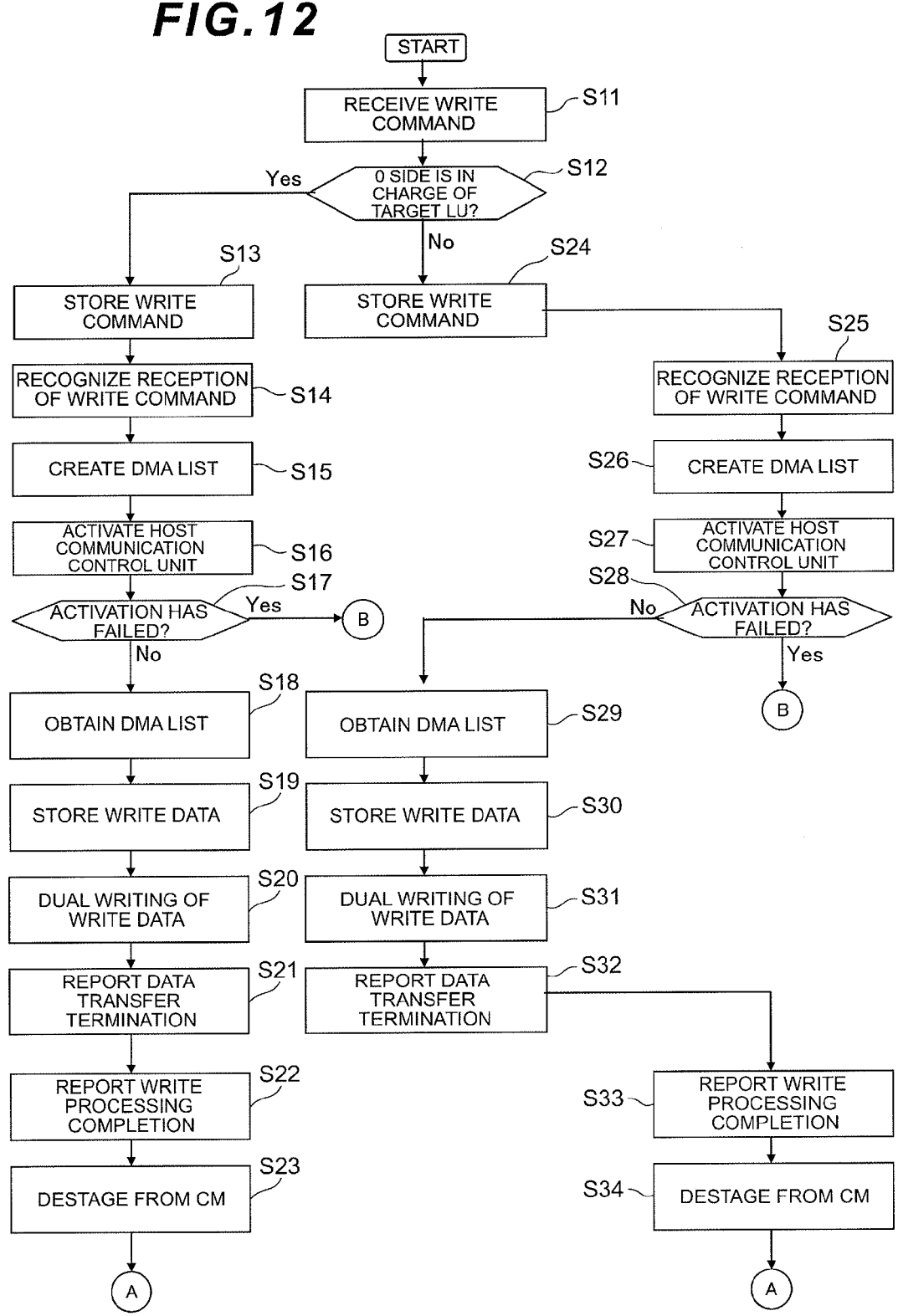
FIG. 12 is a flowchart explaining processing when receiving a write command.
Figure 13:
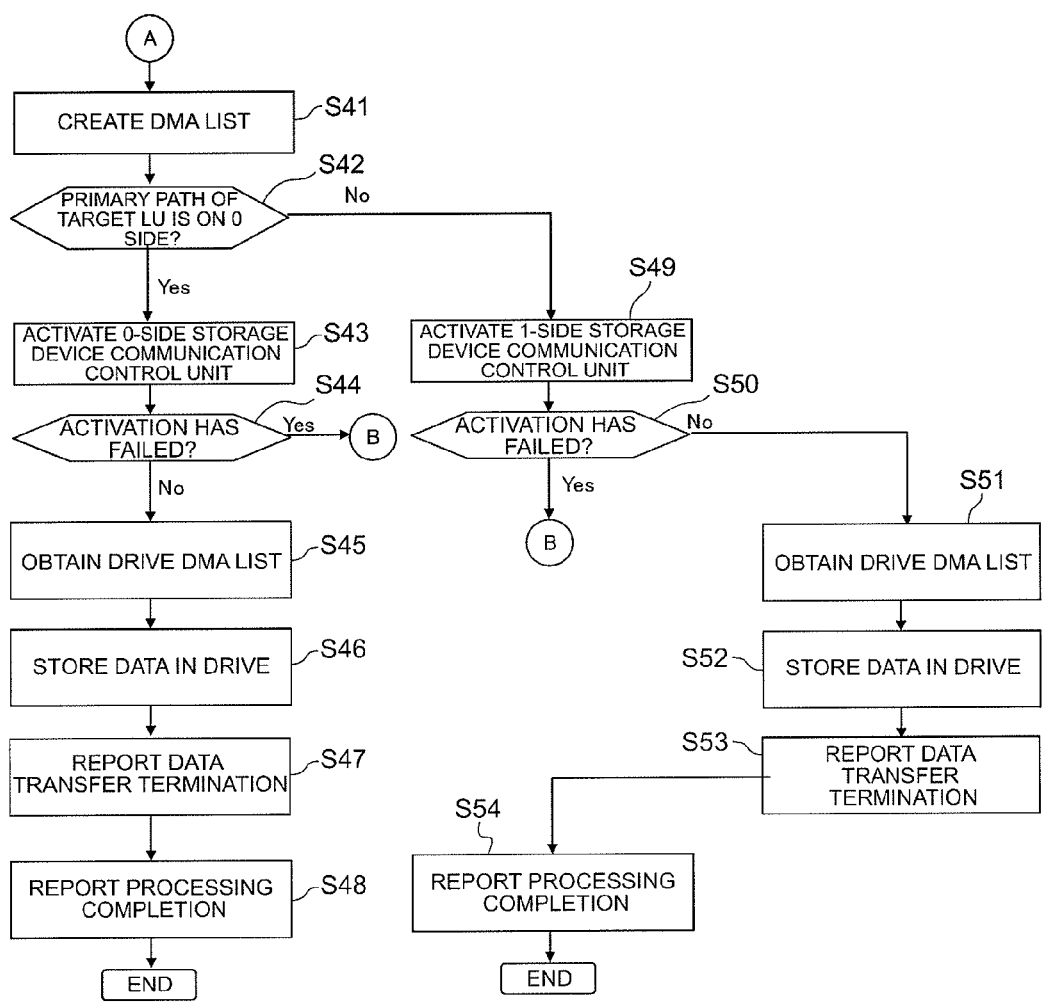
FIG. 13 is a flowchart explaining processing when receiving the write command.

For example, if it is determined in step S17 in FIG. 12 that the activation has failed, the CPU 50 judges whether the access location is on the #0 side (the storage apparatus 22 of the system #0) or not (S61). if an affirmative judgment result is obtained in this step, the CPU 50 judges whether the access location address is on the host communication side (the host communication control unit side) or not (S62); and if an affirmative judgment result is obtained in step S62, the CPU 50 judges whether the access location address is the host communication control unit 28 or not (S63).

If an affirmative judgment result is obtained in step S63, the CPU 50 terminates the command processing on the host communication control unit 28 on the #0 side (S64) and sets ABNORMAL to an entry corresponding to the host communication control unit 28 in the status field 608 of the configuration site information table 600 (S65), thereby terminating the processing in this routine.

On the other hand, if a negative judgment result is obtained in S63, the CPU 50 terminates the command processing on the host communication control unit 34 (S66) and sets ABNORMAL to an entry corresponding to the host communication control unit 34 in the status field 608 of the configuration site information table 600 (S67), thereby terminating the processing in this routine.

On the other hand, if a negative judgment result is obtained in step S62, the CPU 50 judges whether the access location address is the storage device communication control unit 32 or not (S68). If an affirmative judgment result is obtained in this step, the CPU 50 terminates the command processing on the storage device communication control unit 32 (S69) and sets ABNORMAL to an entry corresponding to the storage device communication control unit 32 in the status field 608 of the configuration site information table 600 (S70), thereby terminating the processing in this routine.

Furthermore, if a negative judgment result is obtained in step S68, the CPU 50 terminates the command processing on the storage device communication control unit 38 (S71) and sets ABNORMAL to an entry corresponding to the storage device communication control unit 38 in the status field 608 of the configuration site information table 600 (S72), thereby terminating the processing in this routine.

Incidentally, if a negative judgment result is obtained in step S61, the access location address is on the #1 side (the storage apparatus 24 of the system #1) and, therefore, the CPU 70 executes the same processing as in steps S62 to S72.

If the above-described entire processing is executed and the CPU 50, 70 has failed the activation of the host communication control unit 28, 34 or the storage device communication control unit 32, 38 in the process of the above-described processing, it can terminates the command processing on the host communication control unit 28, 34 or the storage device communication control unit 32, 38.

Figure 15:
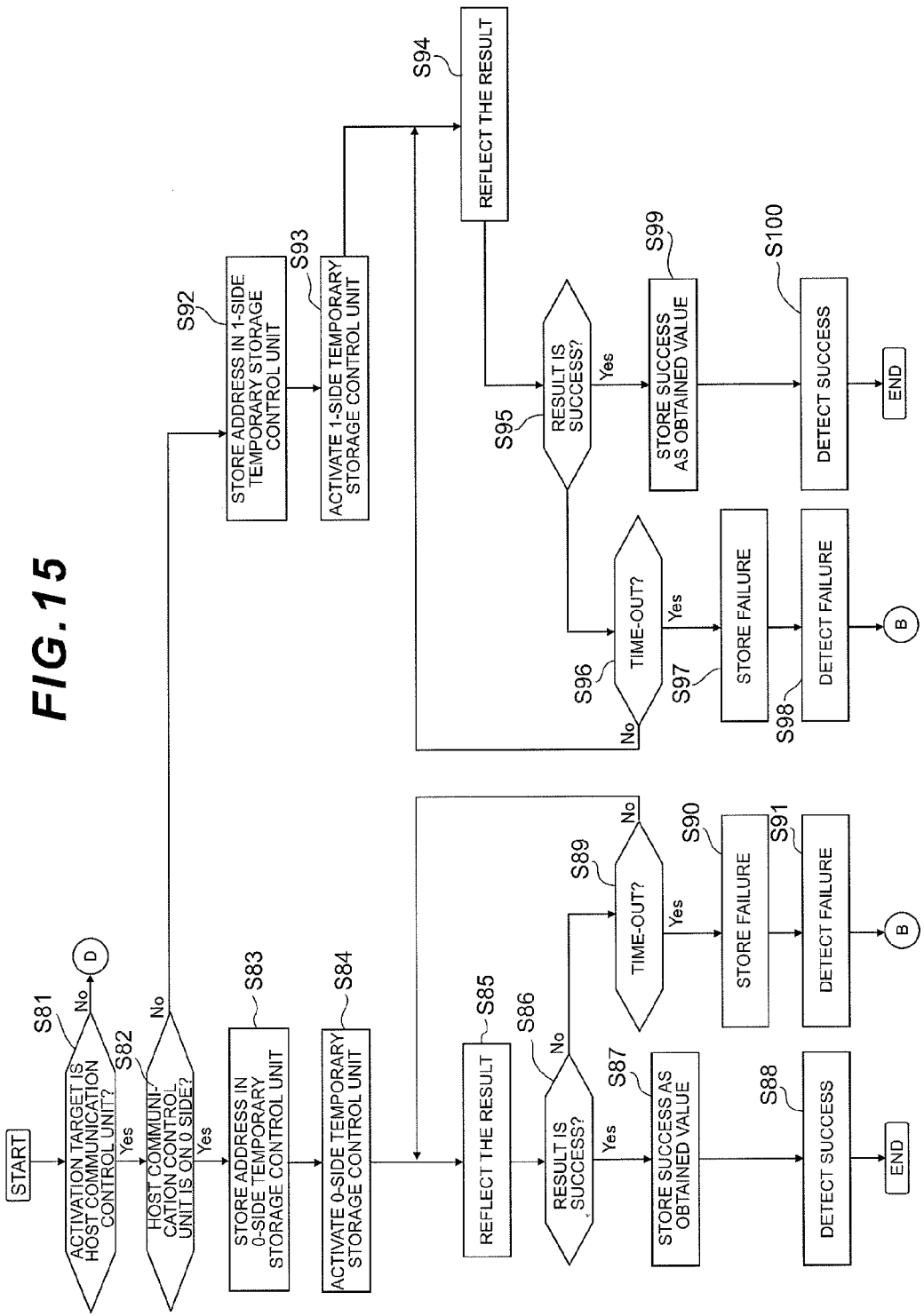
FIG. 15 is a flowchart explaining processing for detecting a fault during I/O processing.

Next, processing for detecting a fault during I/O processing will be explained with reference to a flowchart in FIG. 15.

Firstly, during the process of the I/O processing, the CPU 50 judges whether the activation target is the host communication control unit or not (S81). If an affirmative judgment result is obtained in this step, the CPU 50 judges whether the activation target is the host communication control unit 28 or not (S82). If an affirmative judgment result is obtained in this step, the CPU 50 stores the address, which identifies the activation target, in the temporary storage control unit 58 (S83) and then activates the temporary storage control unit 58 (S84).

Next, the activated temporary storage control unit 58 communicates with the host communication control unit 28 and judges whether or not abnormality exists in the host communication control unit 28; and then sends the judgment result to the CPU 50 as processing for reflecting the judgment result (S85).

Then, the CPU 50 judges whether the result has been reflected by the temporary storage control unit 58 successfully or not (S86). If it is determined in step S86 that the result has been reflected successfully, the CPU 50 stores SUCCESS as an obtained value in the reading result field 706 of the information management table 700 (S87).

Subsequently, if the CPU 50 refers to the information management table 700 and detects that the reading result of the temporary storage control unit 58 is successful, the CPU 50 records NORMAL as the detection result in the status field 608 of the configuration site information table 600 (S88), thereby terminating the processing in this routine.

On the other hand, if a negative judgment result is obtained in step S86, determining that the reading result is a failure, the CPU 50 performs monitoring for a certain period of time to see if it is time-out or not (S89). If it is not time-out, the CPU 50 returns to the processing in step S85; and if it is determined to be time-out, the CPU 50 stores FAILURE in the reading result field 706 of the information management table 700 (S90).

Figure 14:
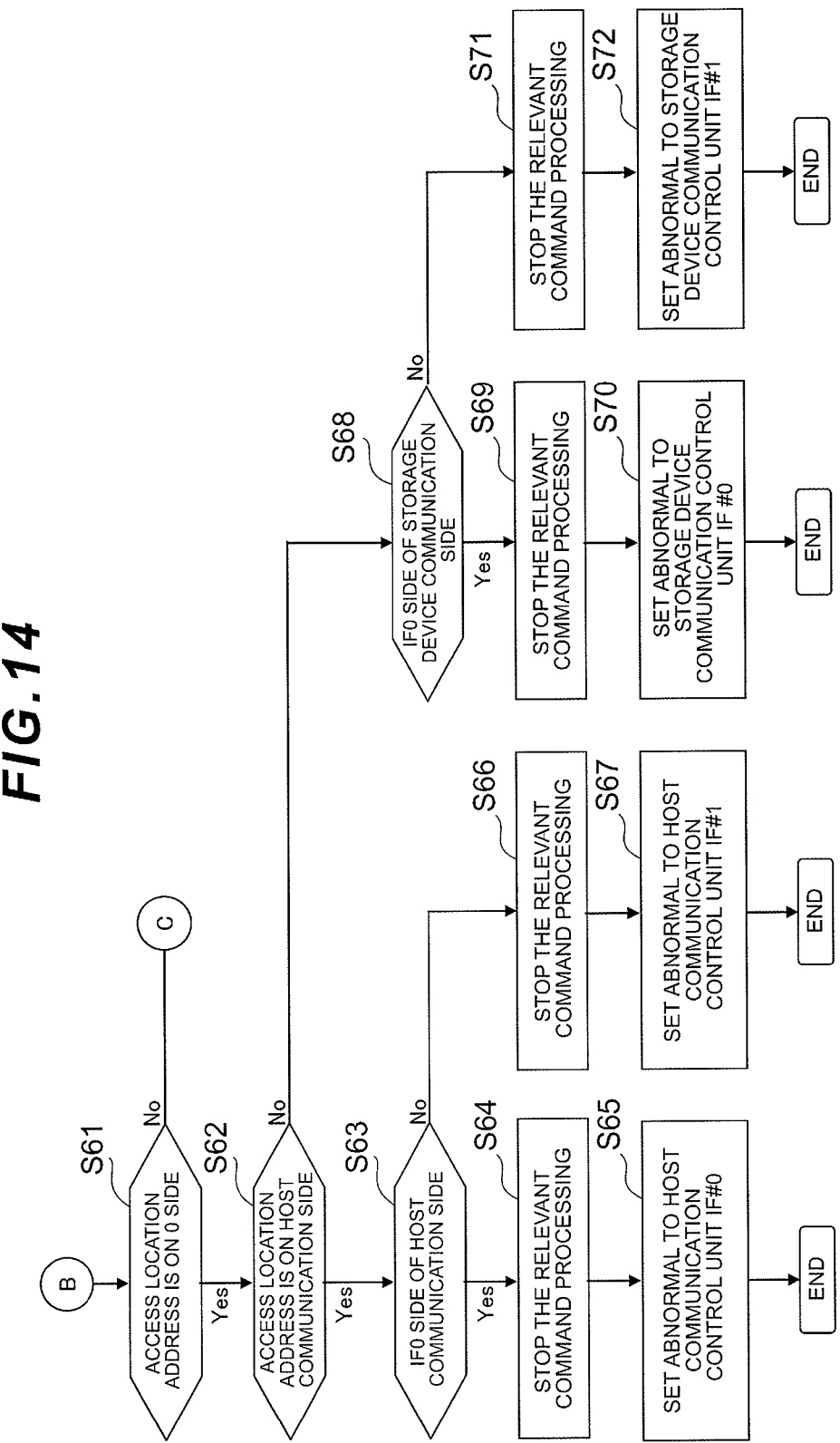
FIG. 14 is a flowchart explaining processing when activation has failed.

Next, if the CPU 50 refers to the information management table 700 and detects that the reading result of the temporary storage control unit 58 is a failure, the CPU 50 records ABNORMAL in the status field 608 of the configuration site information table 600 (S91) and executes the processing shown in FIG. 14 (steps S61 to S72) as processing to be executed when the activation has failed.

Furthermore, if it is determined in step S82 that the activation target is the host communication control unit 34 on the #1 side, the CPU 50 stores the address of the activation target in the temporary storage control unit 78 via the data transfer control unit 56, the data transfer path 40, and the data transfer control unit 76 (S92) and activates the temporary storage control unit 78 (S93).

Subsequently, the activated temporary storage control unit 78 communicates with the host communication control unit 34 based on the address of the activation target, judges whether or not abnormality exists in the host communication control unit 34, and sends the judgment result to the CPU 50 as processing for reflecting this judgment result (S94).

Then, the CPU 50 judges whether the result has been reflected by the temporary storage control unit 78 successfully or not (S95). If it is determined that the reflecting result is a failure, the CPU 50 judges for a certain period of time whether it is time-out or not (S96). If it is not time-out, the CPU 50 returns to the processing in step S94; and if it is determined to be time-out, the CPU 50 stores FAILURE in the reading result field 706 of the information management table 700 (S97).

Next, if the CPU 50 refers to the information management table 700 and detects the FAILURE, it records ABNORMAL in the status field 608 of the configuration site information table 600 (S98) and executes the processing shown in FIG. 14 (steps S61 to S72) as processing to be executed when the activation has failed.

On the other hand, if it is determined in step S95 that the result has been reflected successfully, the CPU 50 stores SUCCESS as an obtained value in the reading result field 706 of the information management table 700 of the temporary storage control unit 78 (S99).

Subsequently, if the CPU 50 refers to the information management table 700 and detects the SUCCESS, it records NORMAL in the status field 608 of the configuration site information table 600 (S100), thereby terminating the processing in this routine.

Incidentally, if a negative judgment result is obtained in step S81, determining that the activation target is the storage device communication control unit, the CPU 50 judges whether the activation target is the storage device communication control unit 32 or not, as subsequent processing.

Specifically speaking, the CPU 50 judges in step S82 whether the storage device communication control unit is on the #0 side or not, instead of judging whether the host communication control unit is on the #0 side or not, executes the processing steps S82 to S99 by replacing the activation target with the storage device communication control unit 32 or the storage device communication control unit 38, and judges whether or not abnormality exists in the storage device communication control unit 32 or the storage device communication control unit 38.

If the above-described entire processing is executed and the CPU 50, 70 has failed the activation of the host communication control unit 28, 34 or the storage device communication control unit 32, 38 during the process of the I/O processing, it can terminate the command processing on the host communication control unit 28, 34 or the storage device communication control unit 32, 38.

Figure 16:
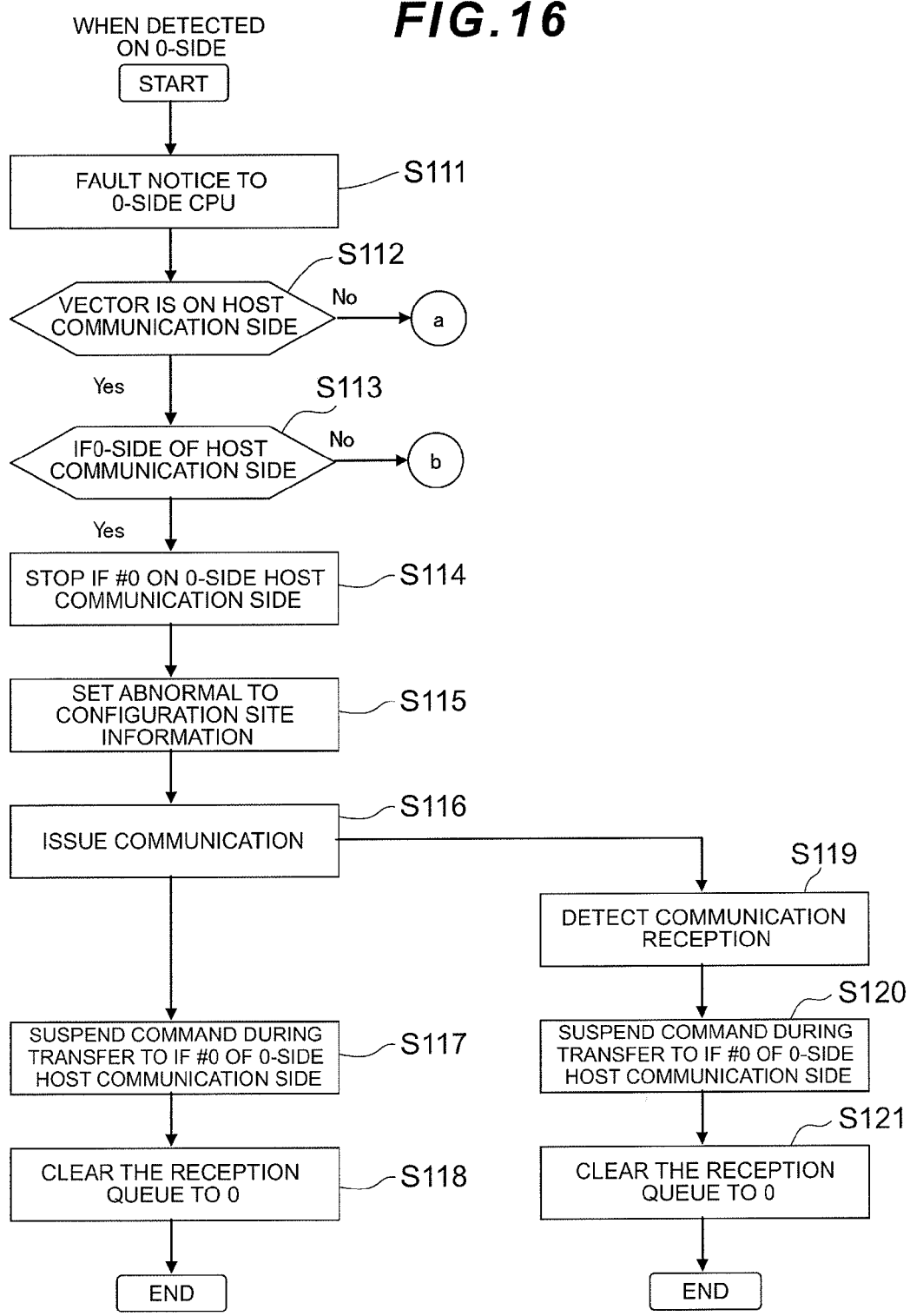
FIG. 16 is a flowchart explaining processing for detecting a fault by interrupt processing.
Figure 17:
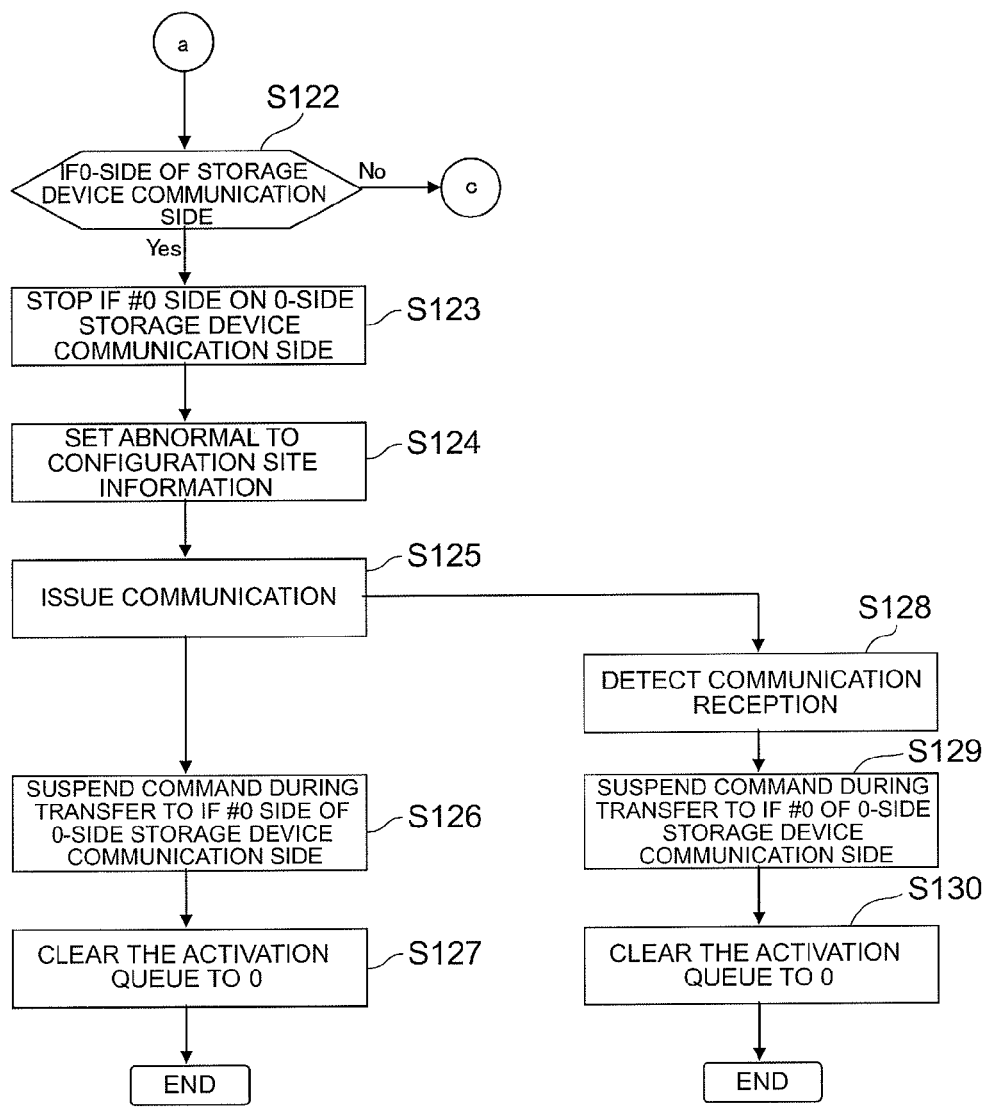
FIG. 17 is a flowchart explaining processing for detecting a fault by the interrupt processing.
Figure 18:
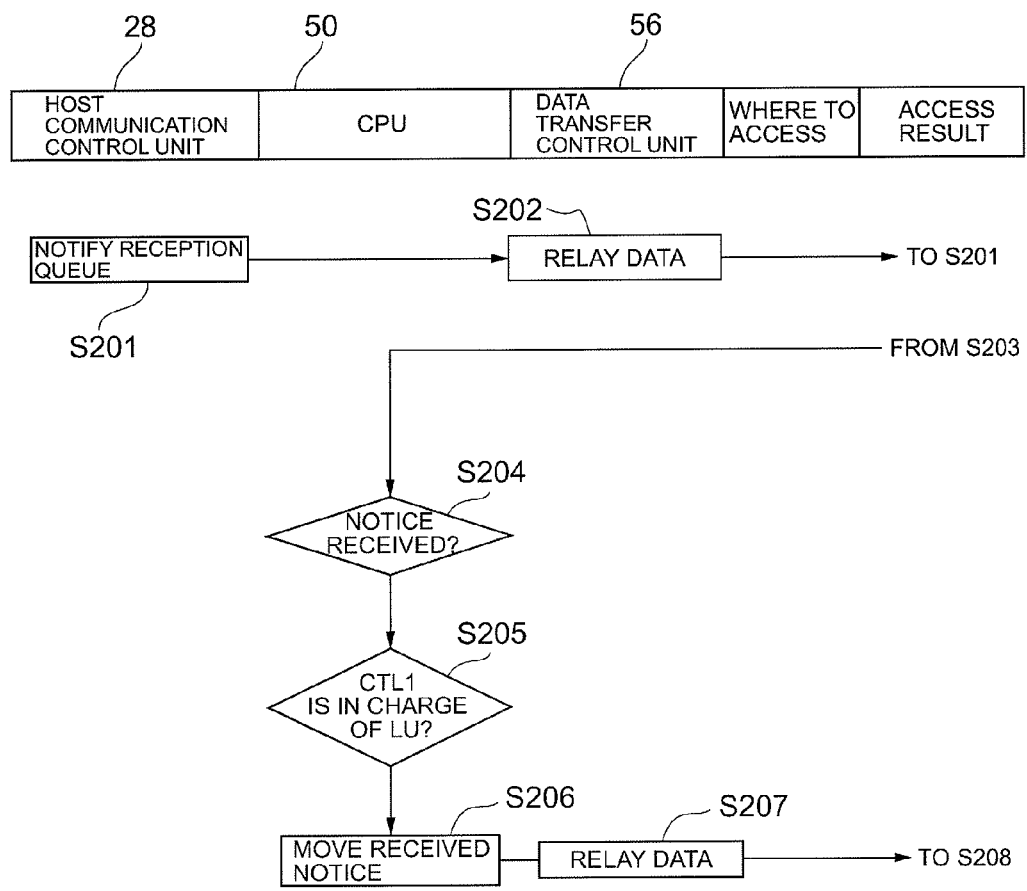
FIG. 18 is a flowchart explaining processing when receiving a write command.
Figure 19:
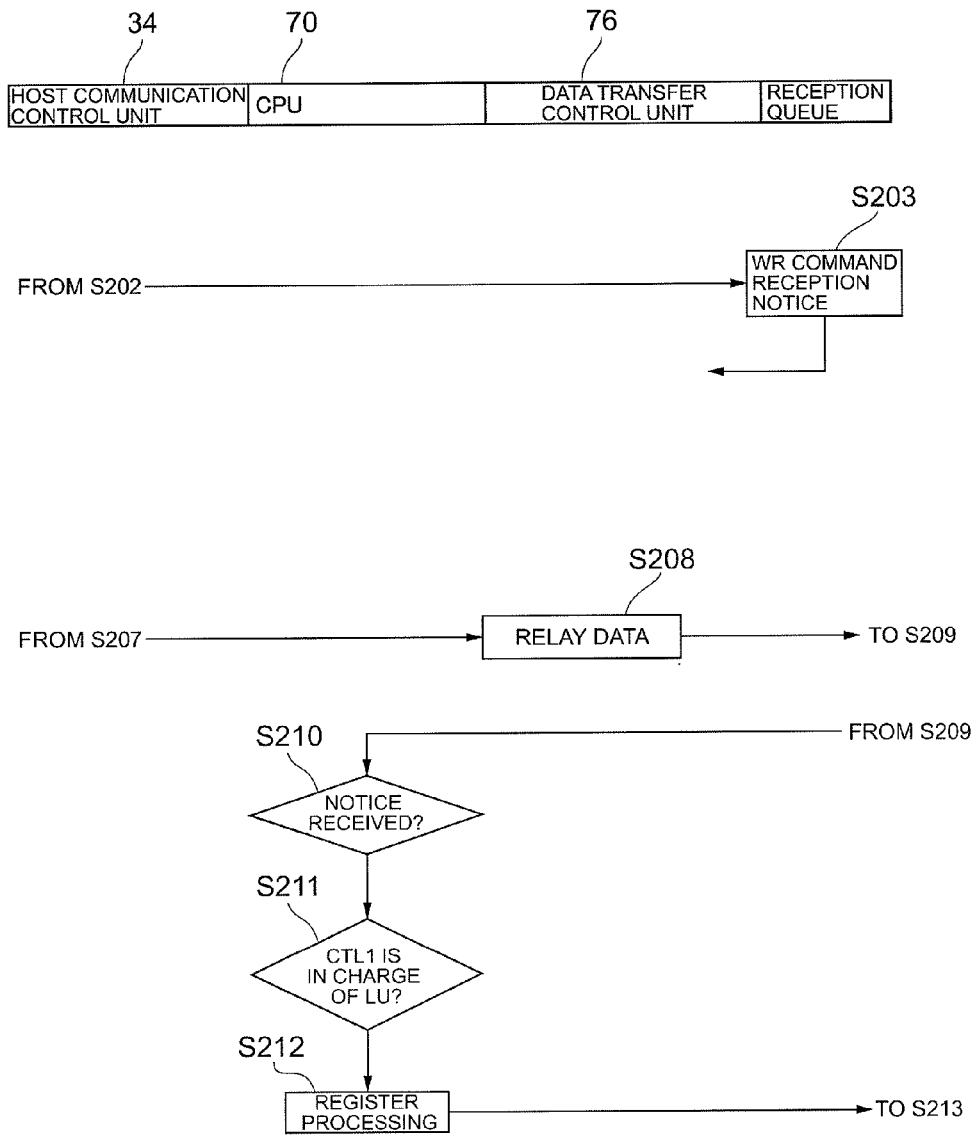
FIG. 19 is a flowchart explaining processing when receiving the write command.
Figure 20:
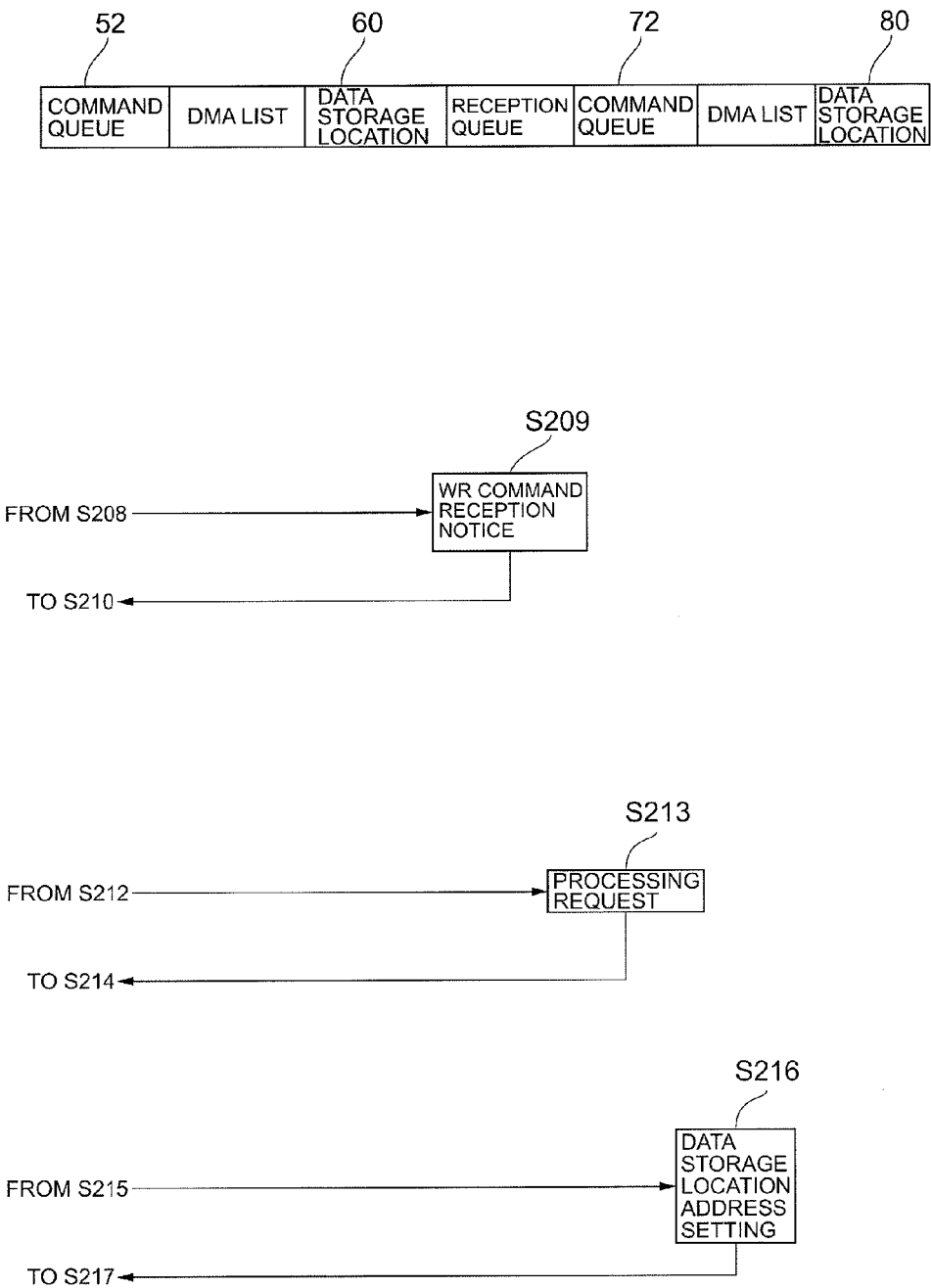
FIG. 20 is a flowchart explaining processing when receiving the write command.
Figure 21:
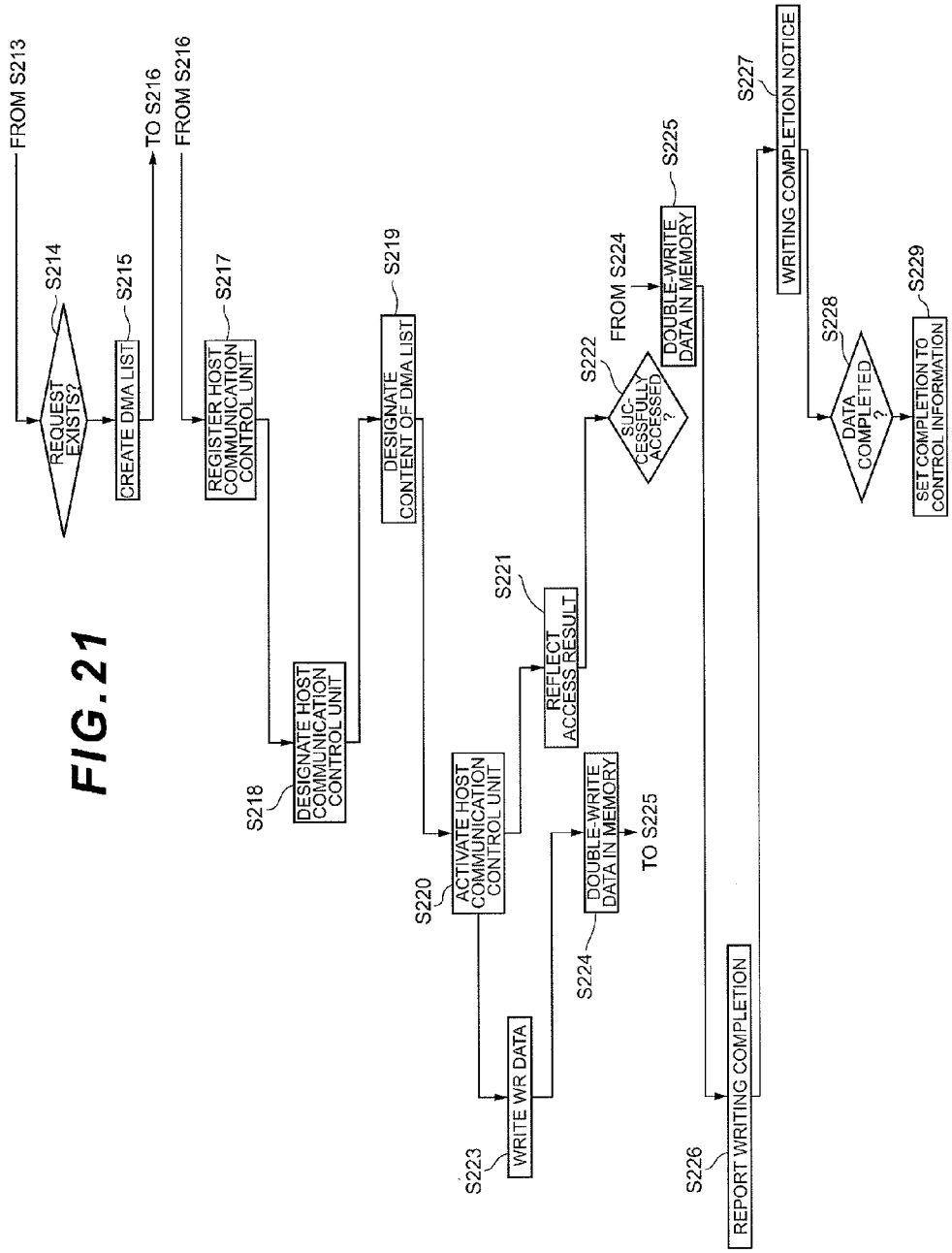
FIG. 21 is a flowchart explaining processing when receiving the write command.

Next, processing for detecting whether abnormality exists or not by the interrupt processing will be explained with reference to flowcharts in FIG. 16 and FIG. 17.

This processing is to judge whether or not abnormality exists in the host communication control unit 28 or the host communication control unit 34 or whether or not abnormality exists in the storage device communication control unit 32 or the storage device communication control unit 38, based on the interrupt processing on the CPU 50 or the CPU 70. If an issuer of the interrupt processing is abnormal under the above-described circumstance, it sends the interrupt processing to the CPU 50 or the CPU 70.

Firstly, if a fault is reported as the interrupt processing on the CPU 50 of the system #0 (S111), the CPU 50 refers to the vector allocation table 800 and judges, based on a vector (vector number) included in the fault notice, whether the requestor of the interrupt processing is on the host communication side (the host communication control unit side) or not (S112). If an affirmative judgment result is obtained in this step, the CPU 50 judges whether or not the requestor of the interrupt processing is the host communication control unit 28 of the system #0 (S113). If an affirmative judgment result is obtained in this step, the CPU 50 stops the host communication control unit 28 of the system #0 (S114).

Subsequently, the CPU 50 sets ABNORMAL to an entry corresponding to the host communication control unit 28 in the status field 608 of the configuration site information table 600 (S115) and issues notice to the CPU 70, stating that the host communication control unit 28 is abnormal (S116).

Next, the CPU 50 executes processing for suspending the processing of the command transferred from the host communication control unit 28 of the system #0 before the occurrence of abnormality (S117) and clears the reception queue 256, which stores the command transferred from the host communication control unit 28 of the system #0, to 0 (S118), thereby terminating the processing in this routine.

On the other hand, if the CPU 70 receives notice from the CPU 50, stating that the host communication control unit 28 has become abnormal, it detects the reception of the notice (S119), suspends the processing of the command transferred from the host communication control unit 28 before the occurrence of abnormality (S110) and clears the reception queue 256, which stores the command transferred from the host communication control unit 28 of the system #0, to 0 (S121), thereby terminating the processing in this routine.

Furthermore, if a negative judgment result is obtained in step S112, the issuer of the interrupt processing is the storage device communication control unit and, therefore, the CPU 50 proceeds to processing in step S122; and if a negative judgment result is obtained in step S113, the issuer of the interrupt processing is the host communication control unit 34 and, therefore, the CPU 70 executes the same processing as in steps S114 to S121.

Next, processing to be executed when the issuer of the interrupt processing is the storage device communication control unit will be explained with reference to the flowchart in FIG. 17.

The CPU 50 judges whether the issuer of the interrupt processing is the storage device communication control unit 32 or not (S122). If an affirmative judgment result is obtained in this step, the CPU 50 stops activation of the storage device communication control unit 32 (S123), sets ABNORMAL to an entry corresponding to the storage device communication control unit 32 in the status field 608 of the configuration site information table 600 (S124), and issues notice to the CPU 70, stating that the storage device communication control unit 32 is abnormal (S125).

Subsequently, the CPU 50 terminates the processing of the command transferred to the storage device communication control unit 32 before the occurrence of abnormality (S126) and clears the activation queue 262, which stores the command transferred to the storage device communication control unit 32, to 0 (S127), thereby terminating the processing in this routine.

On the other hand, if the CPU 70 receives notice from the CPU 50, stating that the storage device communication control unit 32 has become abnormal, it detects the reception of the notice from the CPU 50 (S128), terminates the processing of the command transferred to the storage device communication control unit 32 before the occurrence of abnormality (S129), clears the activation queue 262, which stores the command transferred to the storage device communication control unit 32, to 0 (S30), thereby terminating the processing in this routine.

On the other hand, if a negative judgment result is obtained in step S122, the issuer of the interrupt processing is the storage device communication control unit 38 and, therefore, the CPU 50 sends this judgment result to the CPU 70. As a result, the CPU 70 recognizes that the storage device communication control unit 38 is abnormal; and executes the same processing as in steps S123 to S130.

If the above-described entire processing is executed and the interrupt processing occurs in the process of execution of the above processing, the CPU 50, 70 can terminate the processing of the command transferred from the host communication control unit 28, 34 before the occurrence of abnormality or the command transferred to the storage device communication control unit 32, 38 before the occurrence of abnormality.

Next, the processing to be executed when receiving a write command will be explained with reference to flowcharts in FIG. 18 to FIG. 21.

When the host communication control unit 28 receives a write command from, for example, the host computer 10, the host communication control unit 28 notifies the reception queue 256 of the reception of the write command (S201). Under this circumstance, the data transfer control unit 56 relays the write command (S202) and stores the write command in the reception queue 256 of the local memory 52. The reception queue 256 notifies the CPU 50 of the reception of the write command (S203).

The CPU 50 monitors the status of the reception queue 256 and judges whether it has received notice or not (S204). If the notice has been received, the CPU 50 judges, based on the received notice, whether the controller in charge of the target LU is the controller 36 of the system #1 or not (S205).

If the CPU 50 determines that the controller in charge of the target LU is the controller 36 of the system #1, it executes processing for moving the received notice to the CPU 70 (S206). In this case, the data transfer control unit 56, 76 executes relay processing for transferring the received notice (S207, S208).

The data transfer control unit 76 stores the received notice in the reception queue 256 of the local memory 72. As a result, the reception queue 256 of the local memory 72 notifies the CPU 70 of the reception of the write command (S209).

The CPU 70 monitors the status of the reception queue 256 and judges whether it has received notice or not (S210). If it is determined that the notice has been received, the CPU 70 judges whether the controller in charge of the target LU is the controller 36 of the system #1 or not (S211).

If it is determined in step S211 that the controller in charge of the target LU is the controller 36 of the system #1, the CPU 70 executes processing for registering a processing request in the command queue 258 (S212) and registers the processing request in the command queue 258 of the local memory 72 (S213).

Next, the CPU 70 monitors the status of the command queue 258 of the local memory 72 and judges whether the processing request has been registered in the command queue 258 or not (S214). If an affirmative judgment result is obtained in this step, the CPU 70 creates the DMA list (S215) and sets a data storage location address to the DMA list in the local memory 72 (S216).

Then, the CPU 70 registers the host communication control unit 28 as the activation target in the information management table 700 of the temporary storage control unit 78 and sends the registered content to the data transfer control unit 56 (S217).

The data transfer control unit 56 designates the host communication control unit 28 as the activation target (S218) and sends the designated content to the CPU 70.

When the CPU receives the content with the designated activation target, the CPU 70 executes processing for designating the content of the created DMA list to the data transfer control unit 56 (S219).

The data transfer control unit 56 activates the host communication control unit 28 based on the designation by the CPU 70 (S220).

The data transfer control unit 56 reflects the access result of the activated host communication control unit 28 (S221) and sends the access result to the CPU 70. When this happens, the CPU 70 monitors the access result of the host communication control unit 28 and judges whether the access result is successful or not (S222). If the access result is successful, the CPU 70 proceeds to other processing.

Meanwhile, when the host communication control unit 28 is activated, the host communication control unit 28 writes write data to a write address registered in the DMA list (S223), the data transfer control unit 56 writes the write data to the cache memory 60 (S224), and the data transfer control unit 76 writes the write data to the cache memory 80 (S225).

Next, the host communication control unit 28 executes processing for sending notice of write data writing completion (S226) and sends the notice of the write data writing completion to the reception queue 256 of the local memory 52 (S227). When this happens, the CPU 70 monitors the status of the reception queue 256 of the local memory 72 and judges whether writing of data, that is, write data has been completed or not (S228). If writing of the write data has been completed, the CPU 70 sets completion to the control information (S229), thereby terminating the processing in this routine.

Incidentally, when receiving a read command, processing of the read command can be executed by notifying the reception queue 256 of the read command instead of the write command, then creating a DMA list based on the read command, reading read data from the cache memory 60 based on the created DMA list, and sending the read data, which has been read, to the host computer 10.

Figure 22:
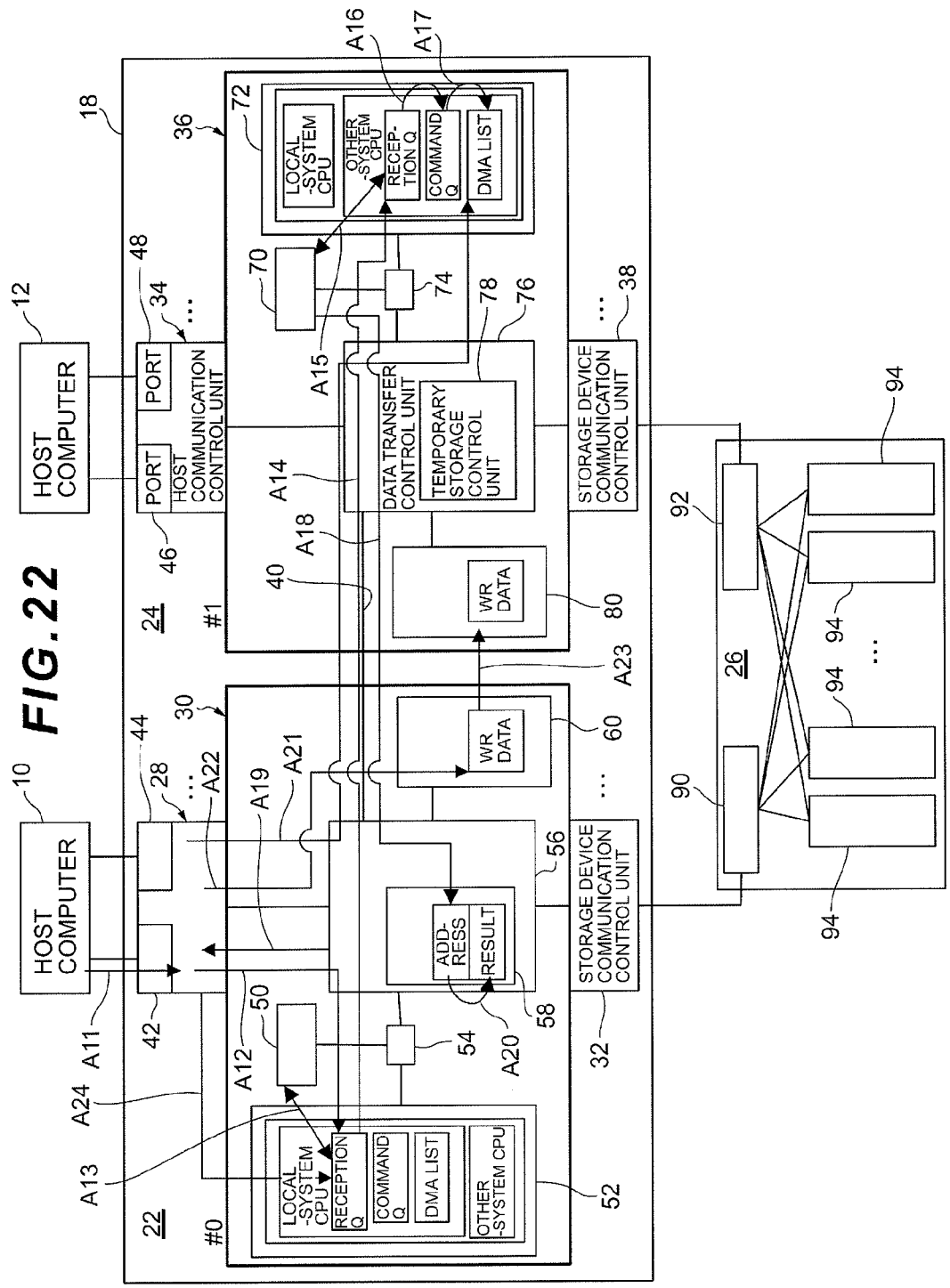
FIG. 22 is a block diagram explaining processing executed when receiving a write command.

Next, FIG. 22 shows a block diagram illustrating the processing in FIG. 18 to FIG. 21 with processing flows or data flows.

Referring to FIG. 22, a data flow A11 represents the processing in step S201, a data flow A12 represents the processing in steps S202 and S203, and a processing flow A13 represents the processing in steps S204 and S205. A data flow A14 represents the processing in steps S206 to S209, a data flow A15 represents the processing in step S210, a data flow A16 represents the processing in step S213, and a data flow A17 represents the processing in steps S215 and S216. A processing flow A18 represents the processing in steps S217 and S218, a processing flow A19 represents the processing in step S220, a processing flow A20 represents the processing in step S221, a processing flow A21 and data flows A22 and A23 represent the processing in steps S223 and S224, and a data flow A24 represents the processing in steps S226 and S227.

Next, processing for using the primary path or the secondary path will be explained with reference to flowcharts in FIG. 23 to FIG. 26.

Firstly, the CPU 70 monitors destage wait and judges whether destage wait exists or not (S301). If it is determined that destage wait exists, the CPU 70 judges whether the target drive is the primary path or not (S302). If it is determined that it is the primary path, the CPU 70 creates a drive DMA list for identifying a storage location of write data based on the write command (S303), registers a data storage location address in the created drive DMA list, and stores the drive DMA list, in which the data storage location address is registered, in the local memory 72 (S304).

Next, the CPU 70 creates an activation command for activating the storage device communication control unit 38 (S305) and stores the created activation command in the activation queue 262 (S306).

Subsequently, the CPU 70 registers the storage device communication control unit 38 as the activation target in the temporary storage control unit 78 (S307) and sends the registered content to the data transfer control unit 76. As a result, the data transfer control unit 76 designates the storage device communication control unit 38 as the activation target (S308).

Next, the CPU 70 designates the content of the created drive DMA list to the data transfer control unit 76 and the storage device communication control unit 38 (S309). Consequently, the data transfer control unit 76 accesses and activates the storage device communication control unit 38, which uses the primary path, based on the designated content (S310). The activated storage device communication control unit 38 executes processing for reflecting the access result (S311).

Under this circumstance, the CPU 70 monitors the access result of the data transfer control unit 76 and judges whether the access result is successful or not (S312). If the access result is successful, the CPU 70 proceeds to other processing.

Meanwhile, the storage device communication control unit 38 executes processing for writing the write data to the storage unit 94 at the data storage location address registered in the drive DMA list based on the designation from the CPU 70 (S313). Then, the storage device communication control unit 38 executes processing for notifying the CPU 70 that writing to the storage unit 94 has been completed (S314); and notifies the activation queue 262 of the local memory 52 of the writing completion (S315).

Subsequently, when the CPU 70 receives the writing completion notice from the storage device communication control unit 38, it monitors the status of the activation queue 262 and judges whether destaging has been completed or not (S316). If destaging has been completed, the CPU 70 sets the destaging completion to the control information (S317), thereby terminating the processing for the case where the primary path is used.

Figure 25:
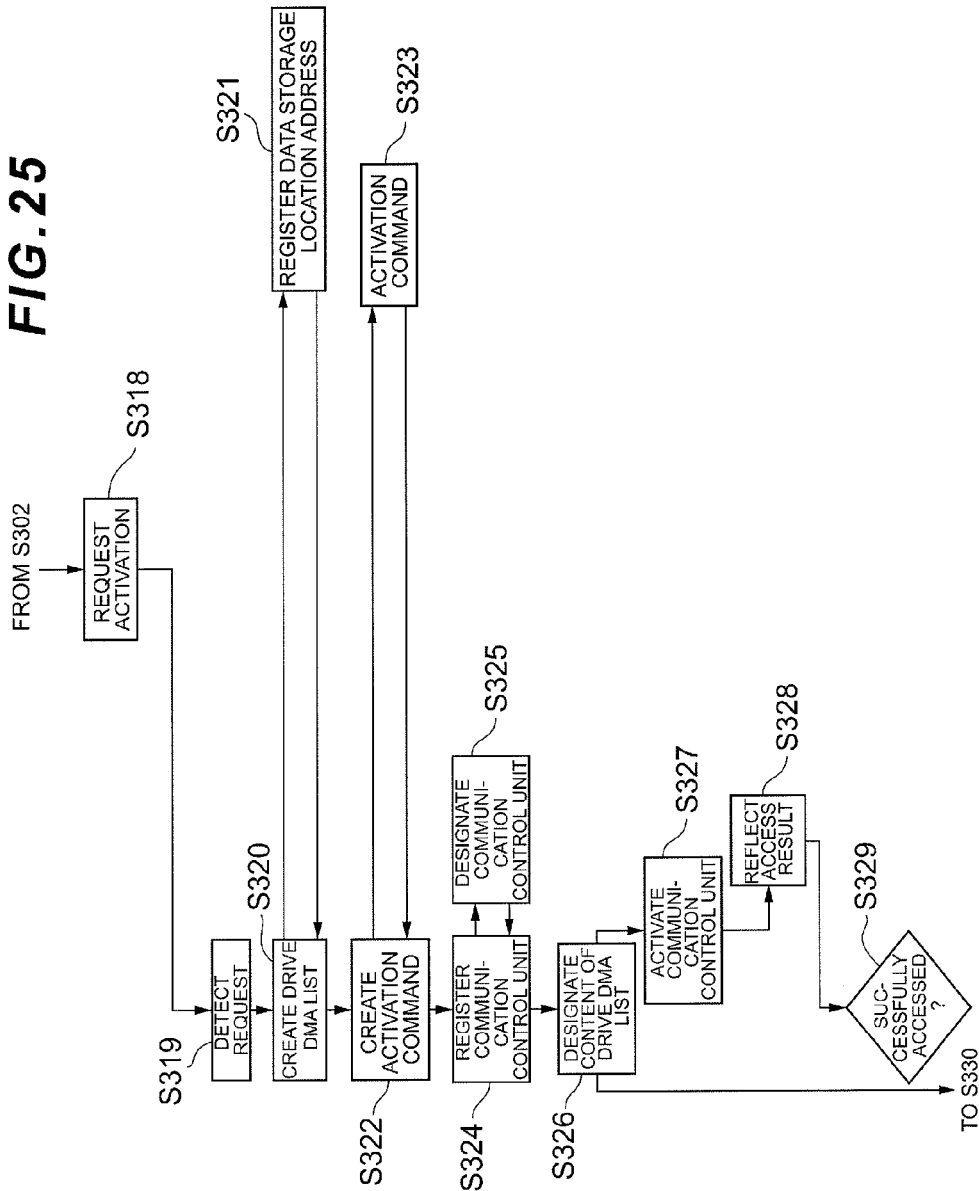
FIG. 25 is a flowchart explaining processing for using a secondary path.

On the other hand, if it is determined in step S302 that the target drive is the secondary path, the CPU 70 requests the CPU 50 to activate the target drive as shown in FIG. 25 (S318).

When the CPU 50 receives the activation request from the CPU 70, it detects the received activation request (S319), creates a drive DMA list based on the detected activation request (S320), registers a data storage location address in the drive DMA list, and stores the drive DMA list, in which the data storage location address is registered, in the local memory 52 (S321).

Next, the CPU 50 creates an activation command to activate the storage device communication control unit 32 (S322) and stores the created activation command in the activation queue 262 of the local memory 52 (S323).

Then, the CPU 50 registers the storage device communication control unit 32 as the activation target in the temporary storage control unit 58 and outputs the registered content to the data transfer control unit 56 (S324). Consequently, the data transfer control unit 56 designates the storage device communication control unit 32 as the activation target (S325).

Subsequently, the CPU 50 designates the content of the created drive DMA list to the data transfer control unit 56 and the storage device communication control unit 32 (S326).

The data transfer control unit 56 accesses and activates the storage device communication control unit 32 based on the content of the drive DMA list (S327). The activated storage device communication control unit 32 executes processing for reflecting the access result (S328).

Under this circumstance, the CPU 50 monitors the access result of the data transfer control unit 56 and judges whether the access has been made successfully or not (S329). If the access has been made successfully, the CPU 50 proceeds to other processing.

Figure 26:
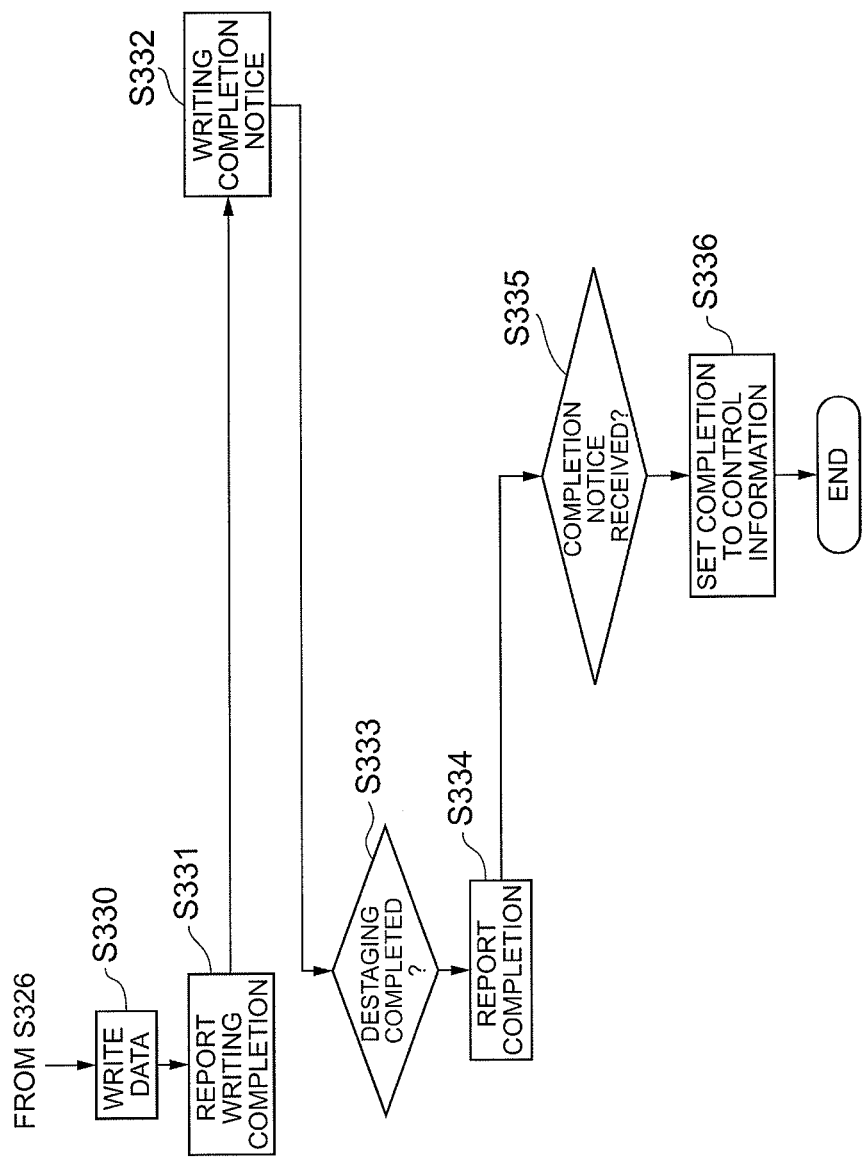
FIG. 26 is a flowchart explaining processing for using the secondary path.

Meanwhile, as shown in FIG. 26, the activated storage device communication control unit 32 executes processing for writing the write data to the storage unit 94 at the data storage location address registered in the drive DMA list (S330). When writing of the data to the storage unit 94 has been completed, the storage device communication control unit 32 executes processing for sending notice of the writing completion (S331) and notifies the activation queue 262 of the local memory 52 of the writing completion (S332).

Under this circumstance, the CPU 50 monitors the status of the activation queue 262 and judges whether destaging has been completed or not (S333). If destaging has been completed, the CPU 50 executes processing for notifying the controller 36, which is the requestor, of the destaging completion (S334) and sends the notice of destaging completion to the CPU 70.

The CPU 70 judges whether it has received the destaging completion notice from the CPU 50 or not (S335). When receiving the destaging completion notice, the CPU 70 sets the completion of the processing to the control information (S336), thereby terminating the processing for the case where the secondary path is used.

Figure 23:
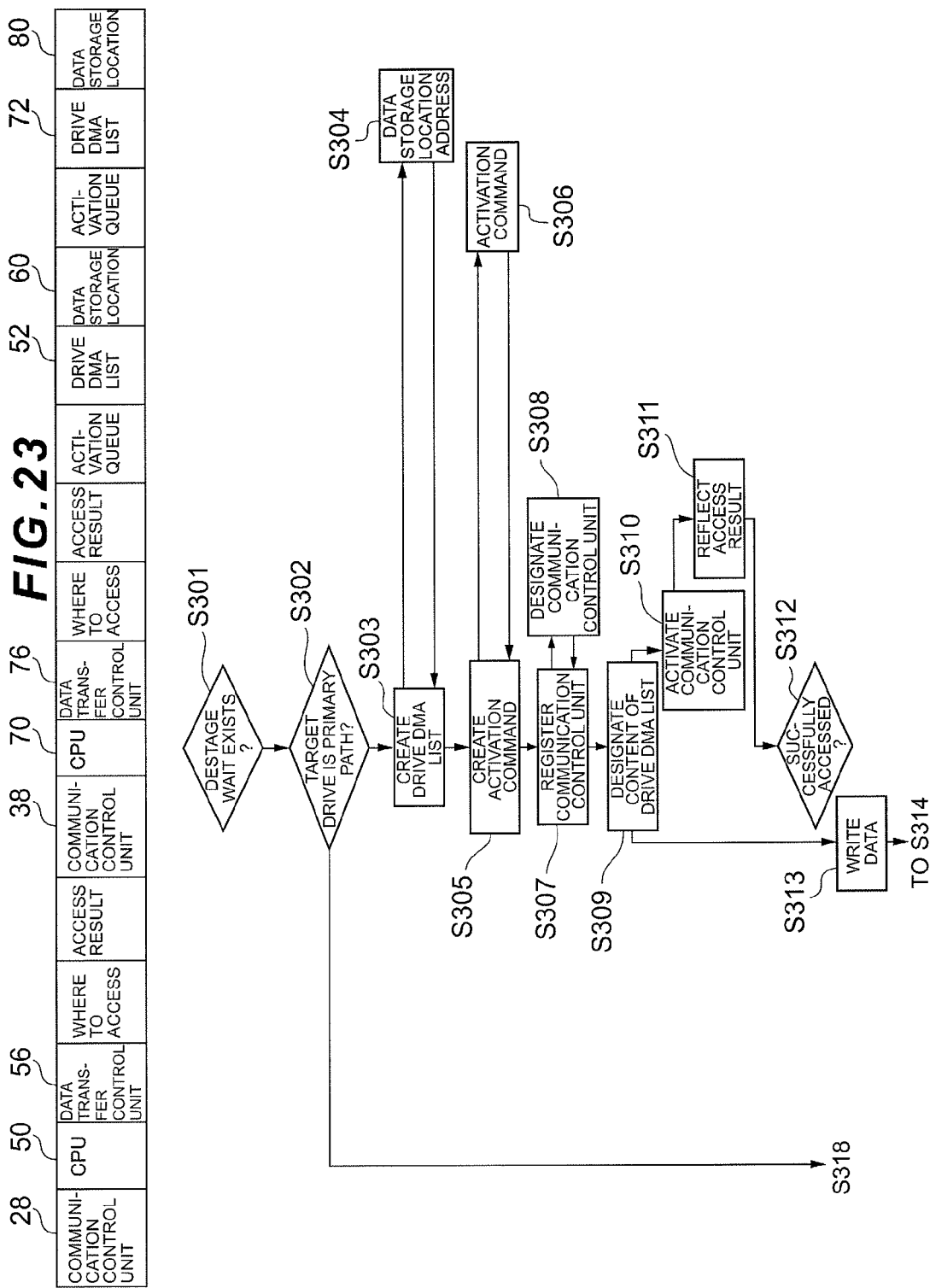
FIG. 23 is a flowchart explaining processing for using a primary path.
Figure 24:
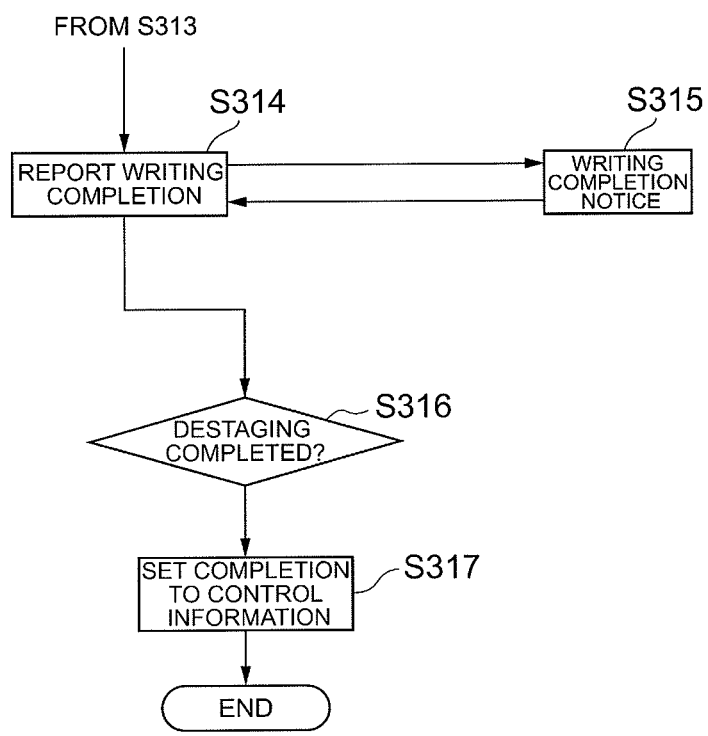
FIG. 24 is a flowchart explaining processing for using the primary path.
Figure 27:
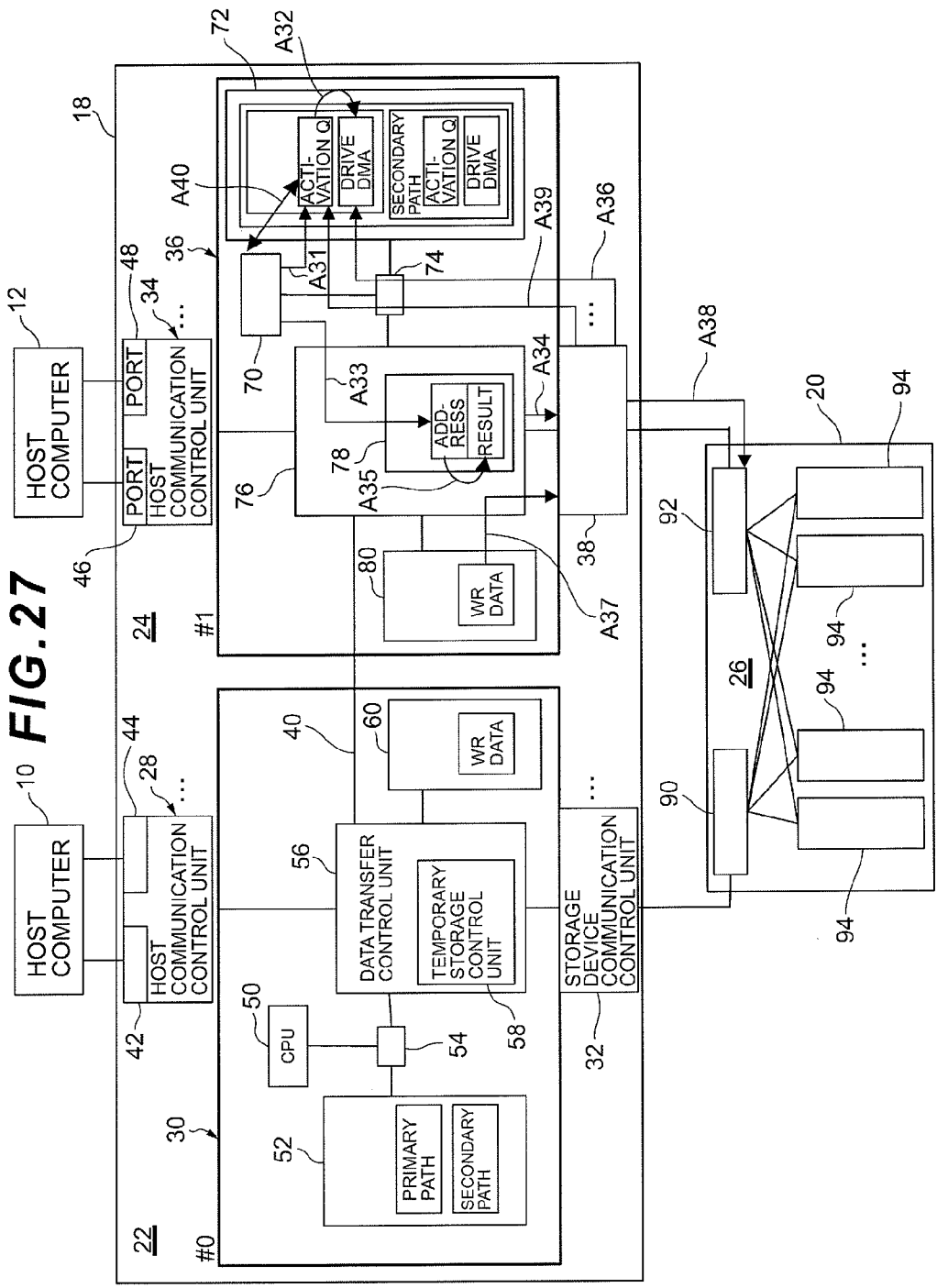
FIG. 27 is a block diagram explaining processing for using the primary path.

Next, FIG. 27 shows a block diagram illustrating the processing in FIG. 23 and FIG. 24 with processing flows or data flows.

Referring to FIG. 27 regarding the processing in FIG. 23 and FIG. 24, a data flow A31 represents the processing in step S303, a data flow A32 represents the processing in step S304, a processing flow A33 represents the processing in steps S305 and S306, and a processing flow A34 represents the processing in step S310. Furthermore, a processing flow A35 represents the processing in step S311, a processing flow A36 and data flows A37 and A38 represent the processing in step S313, and a data flow A39 and a processing flow A40 represent the processing in steps S314 and S315.

Figure 28:
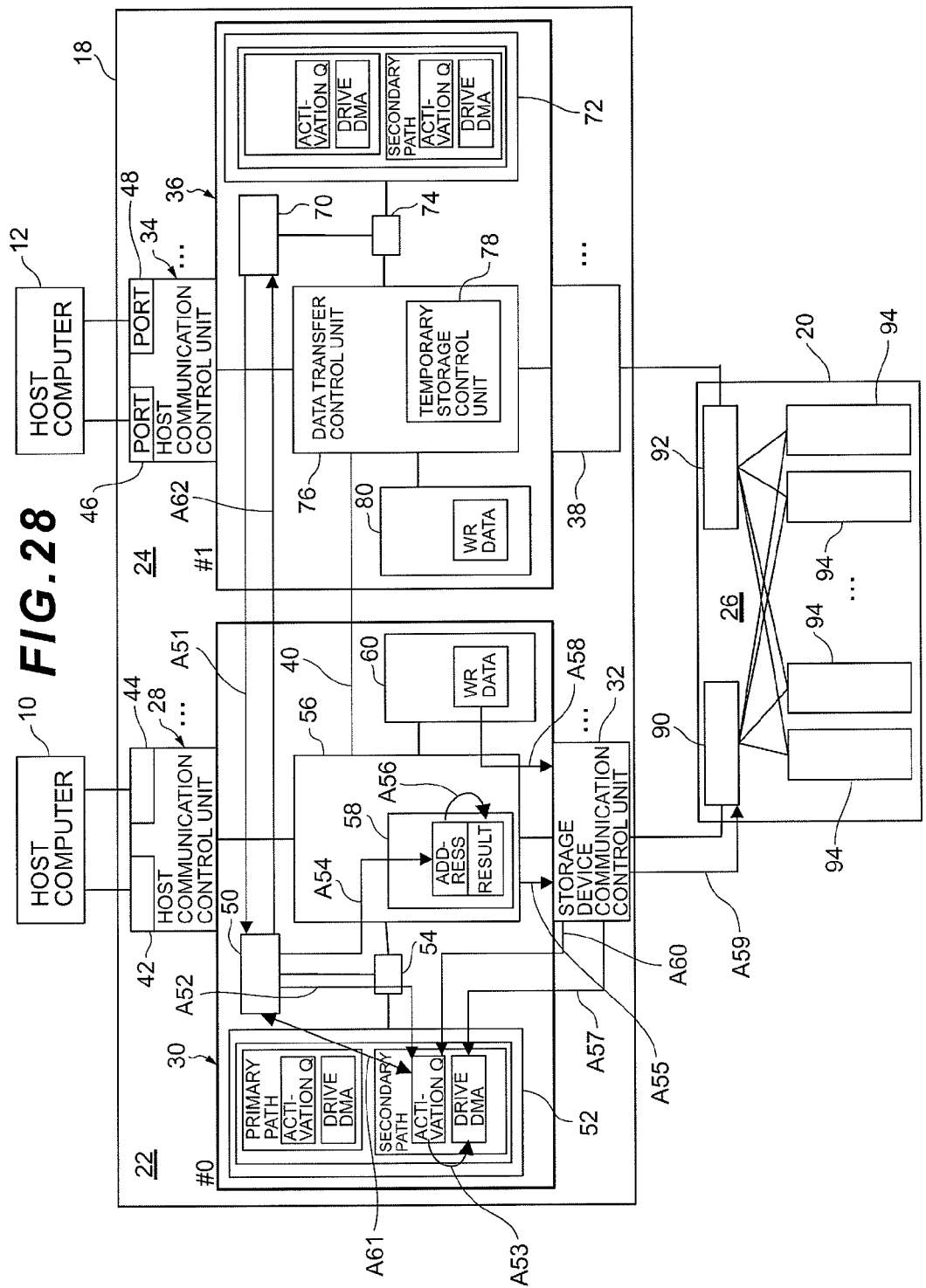
FIG. 28 is a block diagram explaining processing for using the secondary path.

Next, FIG. 28 shows a block diagram illustrating the processing in FIG. 25 and FIG. 26 with processing flows or data flows.

Referring to FIG. 28 regarding the processing in FIG. 25 and FIG. 26, a processing flow A51 represents the processing in step S318, a data flow A52 represents the processing in step S320, a data flow A53 represents the processing in steps S322 and S323, and a processing flow A54 represents the processing in steps S324 to S326. Furthermore, a processing flow A55 represents the processing in step S327, a processing flow A56 represents the processing in step S328, a processing flow A57 and data flows A58 and A59 represent the processing in step S330, a data flow A60 and a processing flow A61 represent the processing in step S331, and a processing flow A62 represents the processing in step S332.

Figure 29:
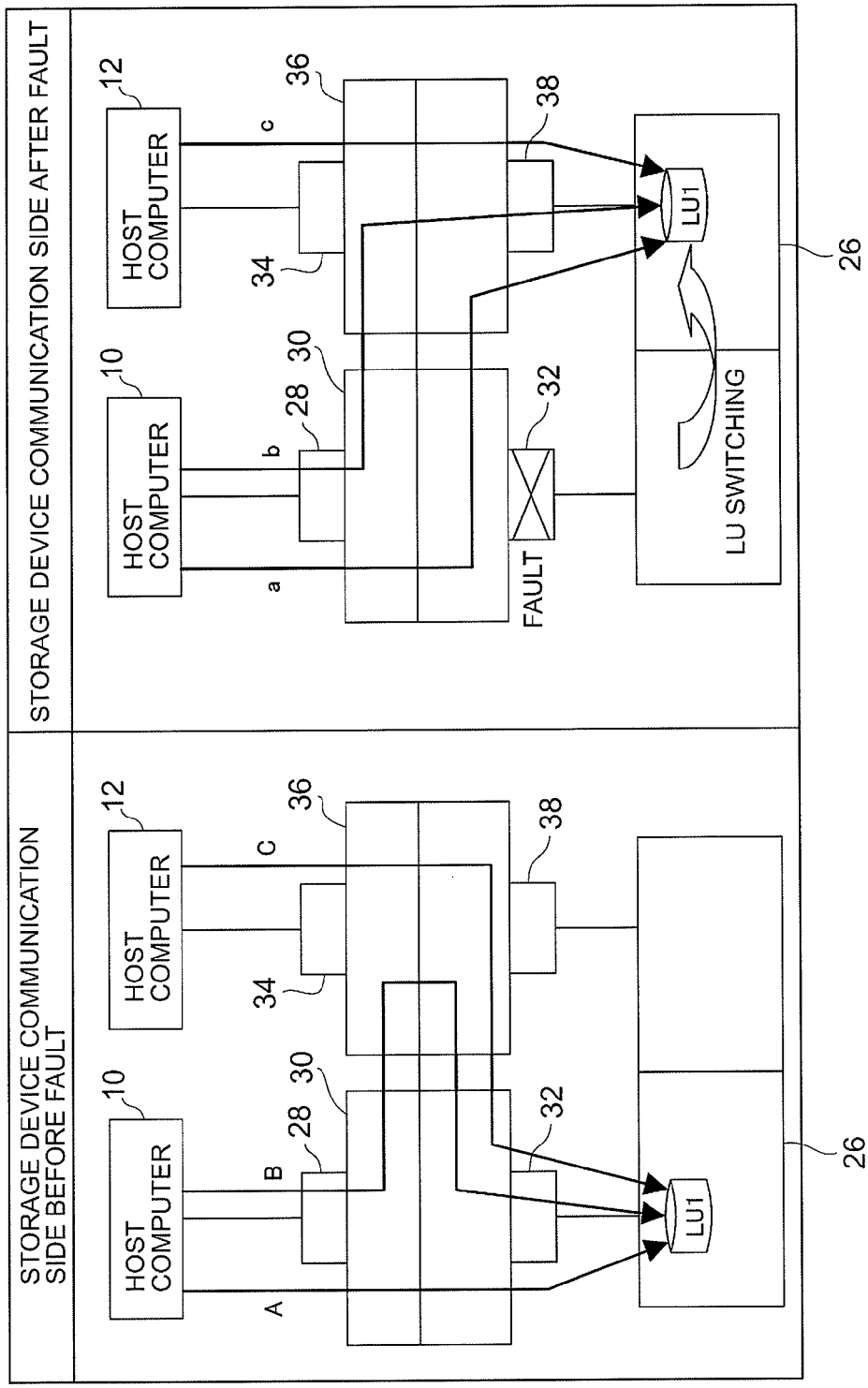
FIG. 29 is a configuration diagram explaining a method for switching a host path when a fault has occurred at a storage device communication control unit.

Next, switching processing for switching a host path will be explained in accordance with a block diagram in FIG. 29.

When all the elements of the storage apparatuses 22, 23 are normal and host paths A, B connecting the host computer 10 and the logical unit LU1 of the system #1 and a host path C connecting the host computer 12 and the logical unit LU1 of the system #1 are set as host paths to the logical unit LU1 of the system #1, the controller 30 executes the I/O processing on a command from the host computer 10 (command for the logical unit LU1 of the system #1 as the access target) by using, for example, the primary path and the controller 36 executes the I/O processing on a command from the host computer 12 (command for the logical unit LU1 of the system #1 as the access target) by using, for example, the secondary path.

If a fault occurs in, for example, the storage device communication control unit 32 in the process of execution of the I/O processing by the controllers 30, 36, the controller 30 switches the path for accessing the logical unit LU1 of the system #1 from the primary path to the secondary path and the controller 36 switches the path for accessing the logical unit LU1 of the system #1 from the secondary path to the primary path in order to access the logical unit LU1 of the system #1 connected to the storage device communication control unit 38.

Consequently, host paths a, b using the host communication control unit 28, the controller 30, and the storage device communication control unit 38 and a host path c using the host communication control unit 34, the controller 36, and the storage device communication control unit 38 are formed as the host paths connecting the host computers 10, 12 and the logical unit LU1 of the system #1.

As a result, even if a fault occurs in the storage device communication control unit 32 in the process of execution of the I/O processing by the controllers 30, 36, the I/O processing on the logical unit LU1 of the system #1 as the access target, which is connected to the storage device communication control unit 38, can continue by using normal resources in the storage apparatuses 22, 24.

If abnormality occurs due to the fault in the storage device communication control unit 32 in the above-described case, the controller 30 will request, after the occurrence of abnormality, the controller 36 belonging to the storage apparatus 24 of the other system via the data transfer path 40 to execute the processing which the storage device communication control unit 32 should take charge of, from among the processing of a command for the local system which is issued from the host computer 10.

If the controller 36 receives the request from the controller 30, it gives an instruction to the storage device communication control unit 38 to execute the processing which the storage device communication control unit 32 should take charge of; and the storage device communication control unit 38 will execute the processing which the storage device communication control unit 32 should take charge of.

Incidentally, if a fault occurs in the storage device communication control unit 38 in the process of execution of the I/O processing by using the storage device communication control unit 38 as the I/O processing by the controllers 30, 36 (I/O processing on the logical unit LU1 of the system #1 as the access target), the I/O processing on the logical unit LU1 of the system #1 as the access target, which is connected to the storage device communication control unit 32, can continue by using normal resources in the storage apparatuses 22, 24.

Figure 30:
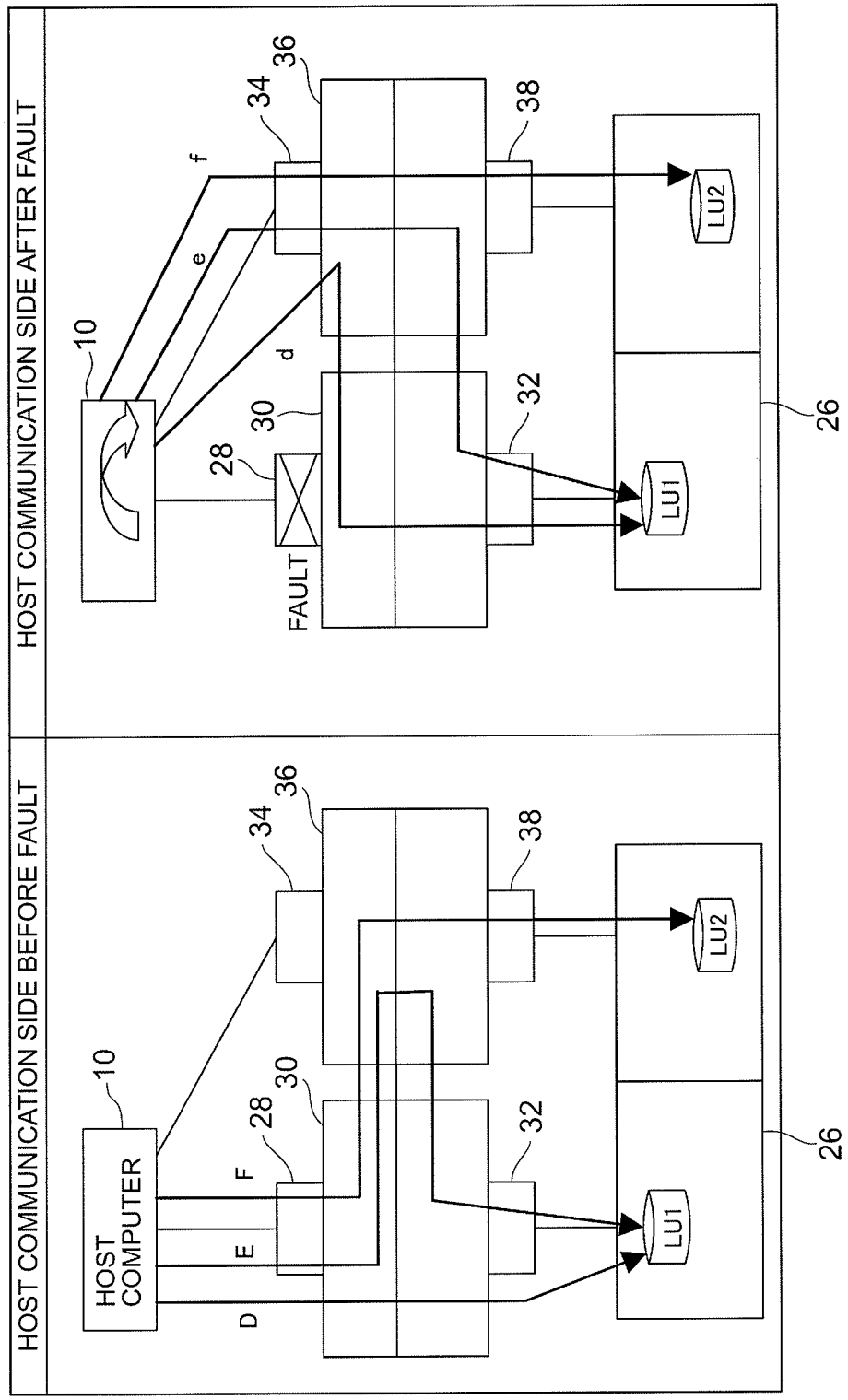
FIG. 30 is a configuration diagram explaining a method for switching a host path when a fault has occurred at a host communication control unit.

Next, switching processing executed when a fault occurs in the host communication control unit, as host path switching processing, will be explained with reference to a block diagram in FIG. 30.

When the storage apparatuses 22, 24 are in a normal state and host paths D, E, F are formed between the host computer 10 and the logical unit LU1 of the system #1 or logical unit LU2 of the system #2, the controller 30 executes the I/O processing on a command for the logical unit LU1 of the system #1 as the access target from among commands from the host computer 10 by using, for example, the primary path, and requests the controller 36 to execute the I/O processing on a command for the logical unit LU2 of the system #2 as the access target from among commands from the host computer 10 by using, for example, the secondary path.

If a fault occurs in, for example, the host communication control unit 28 in the process of execution of the I/O processing by the controllers 30, 36, the host computer 10 executes host path switching processing so that the host paths connecting the host computer 10 and the host communication control unit 28 are switched to host paths connecting the host computer 10 and the host communication control unit 34.

Under this circumstance, the controllers 30, 36 form host paths d, e connecting the host computer 10 and the logical unit LU1 of the system #1 in order to form host paths to the logical unit LU1 of the system #1 as the access target from among commands received from the host communication control unit 34. Furthermore, the controller 36 forms a host path f connecting the host computer 10 and the logical unit LU2 of the system #2 in order to form a host path to the logical unit LU2 of the system #2 as the access target from among commands received from the host communication control unit 34.

Consequently, the host paths d, e using the host communication control unit 34, the controllers 30, 36, and the storage device communication control unit 32 are formed as the host paths connecting the host computer 10 and the logical unit LU1 of the system #1; and the host path f using the host communication control unit 34, the controller 36, and the storage device communication control unit 38 is formed as the host path connecting the host computer 10 and the logical unit LU2 of the system #2.

As a result, even if a fault occurs in the host communication control unit 28 in the process of execution of the I/O processing by the controllers 30, 36, the I/O processing on the logical unit LU1 of the system #1 or the logical unit LU2 of the system #2 as the access target can continue by using normal resources in the storage apparatuses 22, 24.

If abnormality occurs due to the fault in the host communication control unit 28 in the above-described case, the controller 30 selects the storage device communication control unit 32 as a resource to be used for processing after the occurrence of the abnormality and requests, after the occurrence of abnormality, the storage apparatus 24 of the other system via the data transfer path 40 to execute the processing which the host communication control unit 28 should take charge of, from among the processing of a command for the local system, which is issued from the host computer 10.

On condition that the host path switching processing has been executed by the host computer 10 and the host path connecting the host computer 10 and the host communication control unit 28 has been switched to the host path connecting the host computer 10 and the host communication control unit 34, if the storage apparatus 24 of the other system receives a command, which should be processed by the storage apparatus 22, from the host computer 10, the storage apparatus 24 of the other system transfers the received command via the data transfer path 40 to the controller 30 for the storage apparatus 22.

The controller 30 will execute the processing on the command transferred from the storage apparatus 24 of the other system by using the storage device communication control unit 32 selected as a resource to be used for processing after the occurrence of the abnormality.

Incidentally, even if a fault occurs in the host communication control unit 34 in the process of execution of the I/O processing by the controllers 30, 36, the I/O processing on the logical unit LU1 of the system #1 or the logical unit LU2 of the system #2 as the access target can continue by executing the same processing.

This embodiment adopts a method of dividing each storage apparatus 22, 24 into a plurality of resources and managing the resources when configuring the data processing resources, which intermediate data processing between the host computers 10, 12 and the storage device 26, in the plurality of storage apparatuses 22, 24 as described above.

Under this circumstance, each storage apparatus 22, 24 is constituted from the host communication control unit (interface module) 28, 34, the controller 30, 36, and the storage device communication control unit (subordinate interface) 32, 38.

If abnormality occurs in the host communication control unit 28, 34 belonging to the storage apparatus 22, 24 of the local system or the storage device communication control unit 32, 38 belonging to the storage apparatus 22, 24 of the local system, the controller 30, 36 selects a normal resource, as a resource to be used for processing after the occurrence of the abnormality, from the host communication control unit 28, 34 belonging to the storage apparatus 22, 24 of the local system or the storage device communication control unit 32, 38 belonging to the storage apparatus 22, 24 of the local system, executes processing of commands for the local system, which are issued from the host computer 10, 12 after the occurrence of the abnormality, by using the selected resource, and requests the storage apparatus of the other system via the data transfer path 40 to execute part of the processing of the commands for the local system.

Even if abnormality occurs in part of the data processing resources, the data processing can be executed according to this embodiment by using the normal resource(s).

Furthermore, this embodiment is designed so that even if abnormality occurs in the host communication control unit 28, 34 or the storage device communication control unit 32, 38, the data processing can be executed by using the normal resource(s). Therefore, it is possible to prevent concentration of I/O load on one controller.

Furthermore, this embodiment is designed so that when accessing the host communication control unit 28, 34 or the storage device communication control unit 32, 38, the controller 30, 36 refers to the judgment result of the temporary storage control unit 58, 78 for judging whether or not abnormality exists in the host communication control unit 28, 34 or the storage device communication control unit 32, 38. Therefore, it is possible to reliably identify a fault site and contribute to reduction of the number of replacement parts.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST 10, 12 Host computers
14 Computer system
16 Network
18 Basic chassis
20 Expansion chassis
22, 24 Storage apparatuses
26 Storage device
28 Host communication control unit
30 Controller
32 Storage device communication control unit
34 Host communication control unit
36 Controller
38 Storage device communication control unit
50 CPU
52 Local memory
56 Data transfer control unit
58 Temporary storage control unit
60 Cache memory
70 CPU
72 Local memory
76 Data transfer control unit
78 Temporary storage control unit
80 Cache memory
94 Storage unit

The invention claimed is:

1. A storage subsystem coupled to a host computer, the storage subsystem comprising:
    a plurality of storage devices including a plurality of logic units (LUs);
    a first storage apparatus configured to control data transfer between the host computer and the plurality of storage devices, the first storage apparatus including a first controller coupled to the host computer via a first host communication control unit and to the plurality of storage devices via a first storage device communication control unit; and
    a second storage apparatus configured to control data transfer between the host computer and the plurality of storage devices, the second storage apparatus including a second controller coupled to the host computer via a second host communication control unit and to the plurality of storage devices via a second storage device communication control unit,
    wherein at least one of the first controller and the second controller is configured to:

monitor a status of each of the first host communication control unit, the first storage device communication control unit and the second storage device communication control unit, and on a condition that the status of the first storage device communication unit indicates a failure, switch communication paths for transferring data from the host computer to the plurality of storage devices from a first communication path, a second communication path and a third communication path to a fourth communication path, a fifth communication path and a sixth communication path, wherein:

the first communication path passes through the first host communication control unit, the first controller, and the first storage device communication control unit, the second communication path passes through the first host communication control unit, the second controller, the first controller, and the first storage device communication control unit, the third communication path passes through the second host communication control unit, the second controller, and the first storage device communication control unit, the fourth communication path passes through the first host communication control unit, the first controller, the second controller, and the second storage device communication control unit, the fifth communication path passes through the first host communication control unit, the first controller, the second controller, and the second storage device communication control unit, and the sixth communication path passes through the second host communication control unit, the second controller, and the second storage device communication control unit, wherein:

the first and second storage apparatuses correspond to respective systems, when the storage apparatus of each system receives a command for the other system to be processed by the storage apparatus of the other system from the host computer, the storage apparatus of each system requests the storage apparatus of the other system via one of the communication paths to execute the command for the other system, the first and second controllers each have a temporary storage control unit for judging in whether or not abnormality exists in the first host communication control unit or the first storage device communication control unit, on condition that a judgment result of the temporary storage control unit indicates that they are normal, the first and second controllers for each system send data to, or receive data from, the first host communication control unit or the first storage device communication control unit, if the judgment result of the temporary storage control unit indicates that abnormality exists in the first host communication control unit or the first storage device communication control unit, the first and second controllers each select a normal resource, as a resource to be used for processing after the judgment result of the temporary storage control unit indicates the occurrence of the abnormality, from the first host communication control unit or the first storage device communication control unit.

2. The storage subsystem according to claim 1, wherein:
the first and second storage apparatuses correspond to respective systems, if abnormality occurs in the first host communication control unit, the first and second controllers for each system request the storage apparatus of the other system via one of the communication paths to execute processing, which the first host communication control unit should take charge of, from among processing of the command for the system corresponding to the first storage apparatus issued from the host computer after the occurrence of the abnormality.

3. The storage subsystem according to claim 2, wherein:
on condition that a host path connecting the host information communication control unit belonging to the storage apparatus, in which the abnormality occurred, and the host computer has been switched to a host path connecting the host information communication control unit belonging to the storage apparatus of the other system, which received the request, and the host computer, if the storage apparatus of the other system which received the request from the controller for the storage apparatus, in which the abnormality occurred, receives a command, which should be processed by the storage apparatus in which the abnormality occurred, from the host computer, it transfers the received command via one of the communication paths to the controller for the storage apparatus in which the abnormality occurred, and the controller for the storage apparatus, in which the abnormality occurred, executes processing of the command transferred from the storage apparatus of the other system by using the selected resource.

4. The storage subsystem according to claim 1, wherein:
the first and second storage apparatuses correspond to respective systems, if abnormality occurs in the first storage device communication control unit, the controller for the storage apparatus of each system requests the storage apparatus of the other system via one of the communication paths to execute processing, which the first storage device communication control unit should take charge of, from among processing of the command for the system corresponding to the first storage device issued from the host computer after the occurrence of the abnormality.

5. The storage subsystem according to claim 4, wherein:
if the controller belonging to the storage apparatus of the other system receives the request from the controller for the storage apparatus in which the abnormality occurred, it gives an instruction to the storage device communication control unit belonging to the storage apparatus of the other system to execute processing which the storage device communication control unit belonging to the storage apparatus where the abnormality occurred should take charge of, and the storage device communication control unit belonging to the storage apparatus of the other system executes the processing which the storage device communication control unit belonging to the storage apparatus where the abnormality occurred should take charge of.

6. The storage subsystem according to claim 1, wherein:
the first and second storage apparatuses correspond to respective systems, if abnormality occurs in the first host communication control unit or the first storage device communication control unit, the controller for the storage apparatus of each system stops or suspends processing of a command received from the host computer before the occurrence of the abnormality.

7. The storage subsystem according to claim 1, wherein:
the first and second storage apparatuses correspond to respective systems,
if abnormality occurs in the host communication control unit or the storage device communication control unit belonging to the storage apparatus of each system, the host communication control unit or the storage device communication control unit belonging to the storage apparatus of each system sends interrupt processing to any of the controllers, and
the controller which has received the interrupt processing suspends processing of a command received before the occurrence of the abnormality.

8. A load distribution method for a storage subsystem coupled to a host computer, the storage subsystem comprising a plurality of storage devices including a plurality of logic units (LUs), a first storage apparatus configured to control data transfer between the host computer and the plurality of storage devices, wherein the first storage apparatus includes a first controller coupled to the host computer via a first host communication control unit and to the plurality of storage devices via a first storage device communication control unit, and a second storage apparatus configured to control data transfer between the host computer and the plurality of storage devices, wherein the second storage apparatus includes a second controller coupled to the host computer via a second host communication control unit and to the plurality of storage devices via a second storage device communication control unit,
the method comprising:
one of the first controller and the second controller monitoring a status of each of the first host communication control unit, the first storage device communication control unit and the second storage device communication control unit, and
on a condition that the status of the first storage device communication unit indicates a failure, the one of the first controller and the second controller switching communication paths for transferring data from the host computer to the plurality of storage devices from a first communication path, a second communication path and a third communication path to a fourth communication path, a fifth communication path and a sixth communication path, wherein:
the first communication path passes through the first host communication control unit, the first controller, and the first storage device communication control unit,
the second communication path passes through the first host communication control unit, the second controller, the first controller, and the first storage device communication control unit,
the third communication path passes through the second host communication control unit, the second controller, and the first storage device communication control unit,
the fourth communication path passes through the first host communication control unit, the first controller, the second controller, and the second storage device communication control unit,
the fifth communication path passes through the first host communication control unit, the first controller, the second controller, and the second storage device communication control unit, and
the sixth communication path passes through the second host communication control unit, the second controller, and the second storage device communication control unit,
wherein:
the first and second storage apparatuses correspond to respective systems,
when the storage apparatus of each system receives a command for the other system to be processed by the storage apparatus of the other system from the host computer, the storage apparatus of each system requests the storage apparatus of the other system via one of the communication paths to execute the command for the other system,
the first and second controllers each have a temporary storage control unit for judging in whether or not abnormality exists in the first host communication control unit or the first storage device communication control unit,
on condition that a judgment result of the temporary storage control unit indicates that they are normal, the first and second controllers for each system send data to, or receive data from, the first host communication control unit or the first storage device communication control unit,
if the judgment result of the temporary storage control unit indicates that abnormality exists in the first host communication control unit or the first storage device communication control unit, the first and second controllers each select a normal resource, as a resource to be used for processing after the judgment result of the temporary storage control unit indicates the occurrence of the abnormality, from the first host communication control unit or the first storage device communication control unit.

9. The load distribution method for the storage subsystem according to claim 8, further comprising a step executed by the first and second controllers of, if abnormality occurs in the first host communication control unit, requesting the second storage apparatus via one of the communication paths to execute processing which the first host communication control unit should take charge of, from among processing of the command for a system corresponding to the first storage apparatus issued from the host computer after the occurrence of the abnormality.

10. The load distribution method for the storage subsystem according to claim 9, wherein:
the first and second storage apparatuses correspond to respective systems,
on condition that a host path connecting the host communication control unit belonging to the storage apparatus, in which the abnormality occurred, and the host computer has been switched to a host path connecting the host communication control unit belonging to the storage apparatus of the other system, which received the request, and the host computer, if the storage apparatus of the other system which received the request from the controller for the storage apparatus, in which the abnormality occurred, receives a command, which should be processed by the storage apparatus in which the abnormality occurred, from the host computer, it transfers the received command via one of the communication paths to the controller for the storage apparatus in which the abnormality occurred, and
the controller for the storage apparatus, in which the abnormality occurred, executes processing of the command transferred from the storage apparatus of the other system by using the selected resource.

11. The load distribution method for the storage subsystem according to claim 8, wherein the first and second storage apparatuses correspond to respective systems, the method further comprising a step executed by the first and second controllers, if abnormality occurs in the first storage device communication control unit, requesting the storage apparatus of the other system via one of the communication paths to execute processing, which the first storage device communication control unit should take charge of, from among processing of the command for the system corresponding to the first storage apparatus issued from the host computer after the occurrence of the abnormality.

12. The load distribution method for the storage subsystem according to claim 11, wherein:
   if the controller belonging to the storage apparatus of the other system receives the request from the controller for the storage apparatus in which the abnormality occurred, it gives an instruction to the storage device communication control unit belonging to the storage apparatus of the other system to execute processing which the storage device communication control unit belonging to the storage apparatus where the abnormality occurred should take charge of, and
   the storage device communication control unit belonging to the storage apparatus of the other system executes the processing which the storage device communication control unit belonging to the storage apparatus where the abnormality occurred should take charge of.

13. The load distribution method for the storage subsystem according to claim 8, further comprising a step executed by the first and second controllers, if abnormality occurs in the first host communication control unit or the first storage device communication control unit, stopping or suspending processing of a command received from the host computer before the occurrence of the abnormality.

14. The load distribution method for the storage subsystem according to claim 8, wherein:
   the first and second storage apparatuses correspond to respective systems,
   if abnormality occurs in the host communication control unit or the storage device communication control unit belonging to the storage apparatus of each system, the host communication control unit or the storage device communication control unit belonging to the storage apparatus of each system sends interrupt processing to any of the controllers, and
   the controller which has received the interrupt processing suspends processing of a command received before the occurrence of the abnormality.

* * * * *